(12) United States Patent
Sugiyama

(10) Patent No.: US 7,697,204 B2
(45) Date of Patent: Apr. 13, 2010

(54) ELECTROOPTIC DEVICE AND ELECTRONIC DEVICE

(75) Inventor: Nobuo Sugiyama, Azumino (JP)

(73) Assignee: Epson Imaging Devices Corporation (JP)

( * ) Notice: Subject to any disclaimer, the term of this patent is extended or adjusted under 35 U.S.C. 154(b) by 553 days.

(21) Appl. No.: 11/624,443

(22) Filed: Jan. 18, 2007

(65) Prior Publication Data

US 2007/0165164 A1 Jul. 19, 2007

(30) Foreign Application Priority Data

Jan. 19, 2006 (JP) ............................. 2006-011216

(51) Int. Cl.
*G02B 27/26* (2006.01)
*G02B 27/22* (2006.01)

(52) U.S. Cl. ....................... 359/465; 359/463; 359/462; 349/15; 348/57; 348/58

(58) Field of Classification Search ................. 359/462, 359/465, 463; 349/15; 348/57, 58
See application file for complete search history.

(56) References Cited

U.S. PATENT DOCUMENTS

| 5,917,562 | A | * | 6/1999 | Woodgate et al. | ............. 349/15 |
| 6,130,731 | A | * | 10/2000 | Andersson et al. | ............ 349/77 |
| 2006/0209371 | A1 | | 9/2006 | Hamagishi | |
| 2006/0209407 | A1 | | 9/2006 | Hamagishi | |

FOREIGN PATENT DOCUMENTS

| JP | 10-221644 | 8/1998 |
| JP | 2857429 | 11/1998 |
| JP | 2000-036927 | 2/2000 |
| JP | 2000-197073 | 7/2000 |

* cited by examiner

*Primary Examiner*—Audrey Y Chang
(74) *Attorney, Agent, or Firm*—Harness, Dickey & Pierce, P.L.C.

(57) ABSTRACT

An electrooptic device includes: a display panel for displaying images; an illumination system for applying light to the display panel; a polarizing-axis control unit disposed between the illuminating system and the display panel, the control unit allowing light having a first polarizing axis of the light emitted from the illuminating system to pass through, and changing part of the light from the illuminating system into light with a second polarizing axis that is substantially orthogonal to the first polarizing axis; a lens disposed between the polarizing-axis control unit and the display panel, the lens including a plurality of linear lens patterns directing the light with the first polarizing axis and the light with the second polarizing axis separated by the polarizing-axis control unit into specified directions; a first polarizing unit disposed between the illumination system and the lens; and a second polarizing unit disposed between the display panel and the lens. Both the polarizing axis of the first polarizing unit and the polarizing axis of the second polarizing unit are substantially parallel to or perpendicular to the extension of the lens patterns.

7 Claims, 17 Drawing Sheets

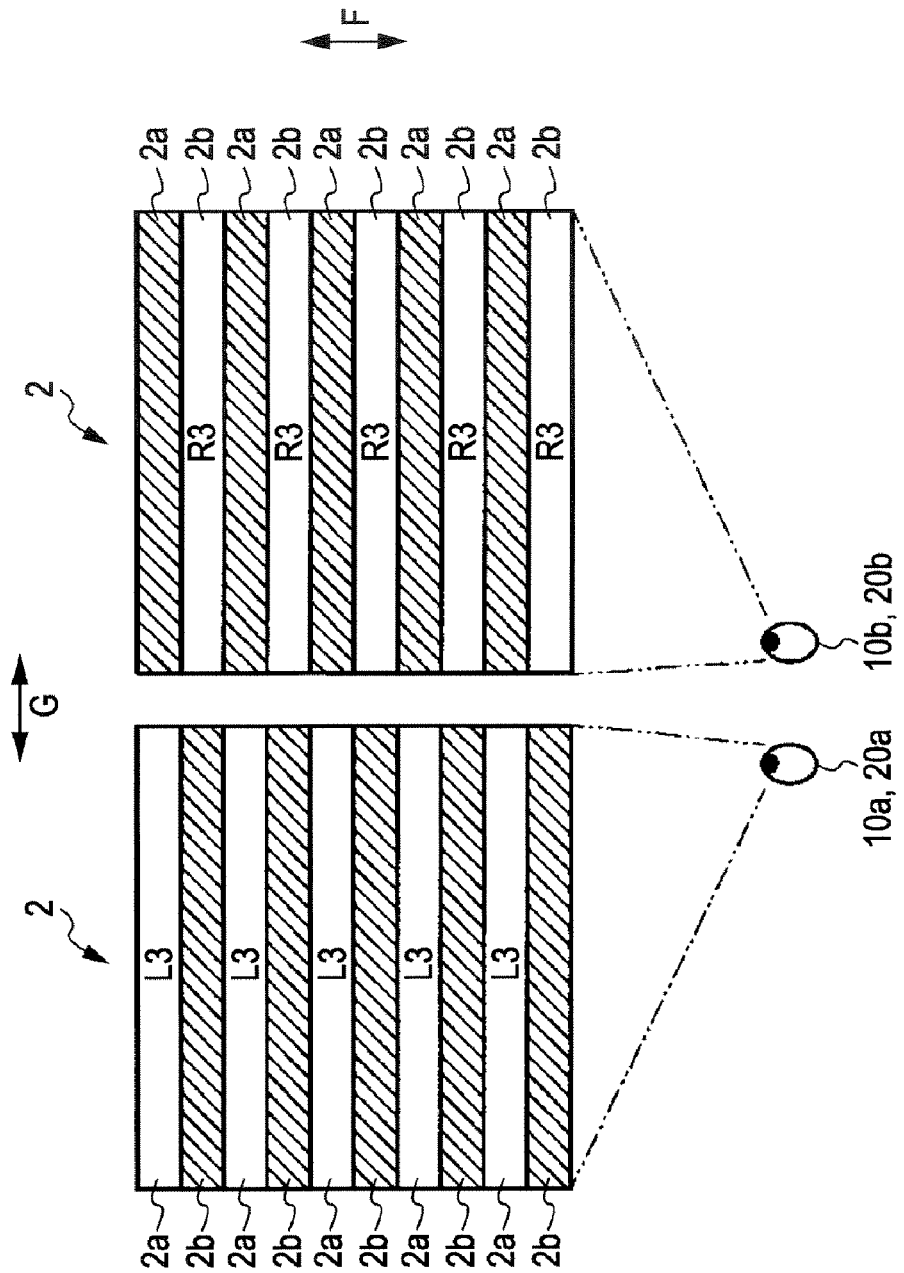

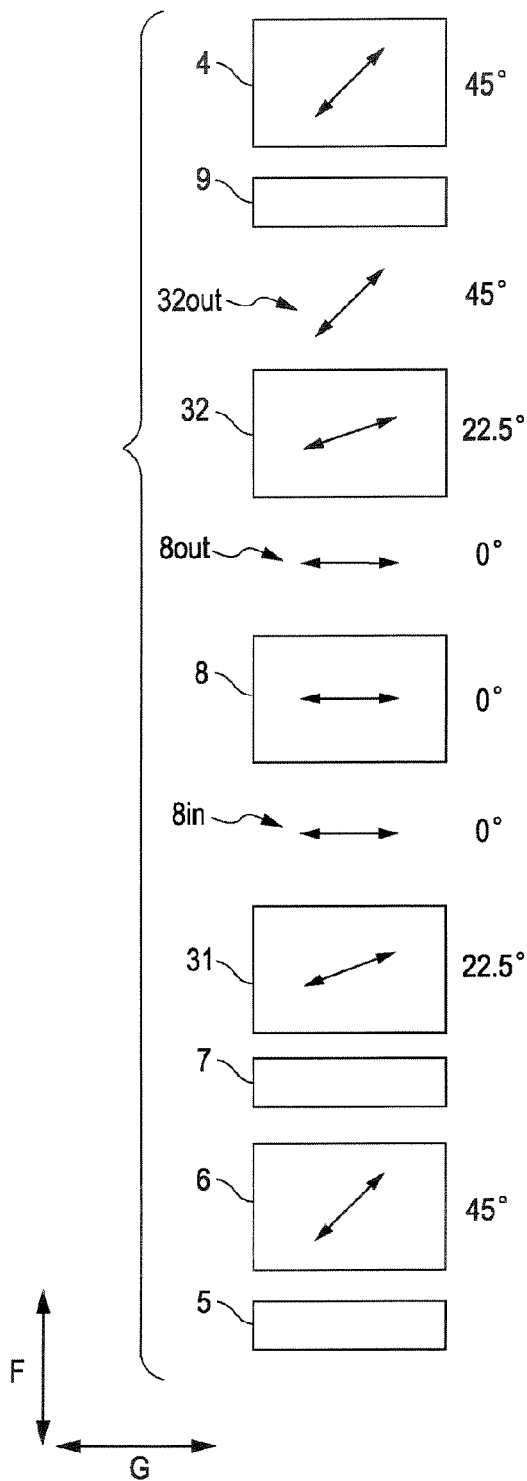
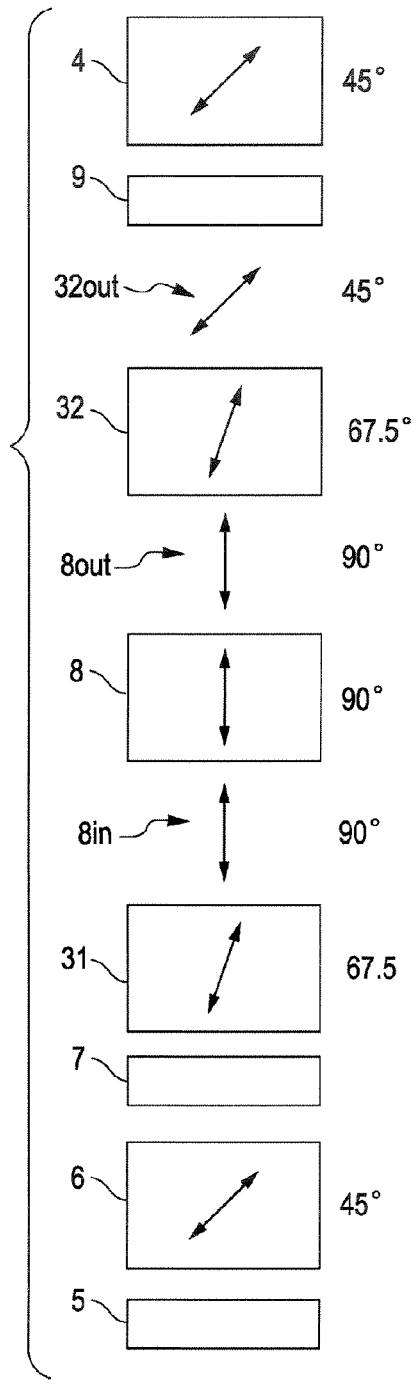

ELECTROOPTIC DEVICE AND ELECTRONIC DEVICE

BACKGROUND

1. Technical Field

The present invention relates to an electrooptic device and an electronic device suitable for use in displaying various information.

2. Related Art

Known electrooptic devices include image display devices such as stereoscopic display devices that display 3D images and double display devices that present different images to viewers in different positions. One of the 3D stereoscopic display devices is disclosed in Japanese Patent No. 2857429 which is capable of stereoscopic display of a parallax barrier system. This image display device controls an electronic parallax barrier of the image display surface adjacent to the viewer by a control means such as a microcomputer to generate stripe openings and light shielding portions of a specified shape in positions of the electronic parallax barrier. For example, the openings of the electronic parallax barrier are formed so that when 3D images are presented to the viewer, an image for left eyes enters viewer's left eyes and an image for right eyes enters viewer's right eyes; when 2D (planar) images are presented to the viewer, the entire area of the electronic parallax barrier are open so that all the images enter the viewer's both eyes.

Furthermore, an image display device capable of double display has appeared which can present different images to viewers in different positions by disposing a barrier having slit openings and light-shielding portions on the side of the display panel adjacent to the viewers.

However, since the image display device disclosed in Japanese Patent No. 2857429 has the electronic parallax barrier on the image display surface on the viewer side, it has the disadvantage that part of the light that has exited from the image display surface is blocked by the light-shielding portions of the electronic parallax barrier. This decreases the luminance of the image seen by the viewer, resulting in a dark image. Moreover, with the known display device capable of double display, the viewing range is decreased as the pixel pitch of the display panel is decreased because the viewing range of the viewer is proportional to the pixel pitch. Accordingly, this display device has the problem of difficulty in providing high-definition images to viewers in different positions.

Thus, an image display device capable of double display and stereoscopic display by controlling the directions of lights having different polarizing axes using a lenticular lens. This image display device has a polarization-controlling liquid crystal panel on the light incident side of the lenticular lens to generate lights having different polarizing axes. The polarization-controlling liquid crystal panel includes a pair of substrates, liquid crystal between the pair of substrates, and a plurality of stripe electrodes on the inner surfaces of the substrates. The polarization-controlling liquid crystal panel can change the orientation of the liquid crystal corresponding to the position of specified electrodes of the stripe electrodes by application of voltage to the specified electrodes. Thus, the polarization-controlling liquid crystal panel can emit light having different polarizing axes including light that passes through the liquid crystal corresponding to the specified electrodes and light that passes through the liquid crystal corresponding to the position other than the position of the specified electrodes.

However, the image display device using the lenticular lens has the problem of depolarization in which the polarizing characteristic of the light incident on the lenticular lens is eliminated by the double refraction or the scattering of light.

SUMMARY

An advantage of some aspects of the invention is to prevent the depolarization of light in electrooptic devices.

An electrooptic device according to a first aspect of the invention comprises: a display panel for displaying images; an illumination system for applying light to the display panel; a polarizing-axis control unit disposed between the illuminating system and the display panel, the control unit allowing light having a first polarizing axis of the light emitted from the illuminating system to pass through, and changing part of the light from the illuminating system into light with a second polarizing axis that is substantially orthogonal to the first polarizing axis; a lens disposed between the polarizing-axis control unit and the display panel, the lens including a plurality of linear lens patterns directing the light with the first polarizing axis and the light with the second polarizing axis separated by the polarizing-axis control unit into specified directions; a first polarizing unit disposed between the illumination system and the lens; and a second polarizing unit disposed between the display panel and the lens. Both the polarizing axis of the first polarizing unit and the polarizing axis of the second polarizing unit are substantially parallel to or perpendicular to the extension of the lens patterns.

An example of the electrooptic device is an image display device for double display or stereoscopic display, which includes a display panel, an illumination system, a polarizing-axis control unit, a lens having a plurality of linear lens patterns, a first polarizing unit, and a second polarizing unit. The display panel displays images. The illumination system is a backlight, which applies light to the display panel. The polarizing-axis control unit is, for example, a polarization-controlling liquid crystal panel, which separates the light emitted from the illumination system into light having a first polarizing axis and light having a second polarizing axis that is substantially orthogonal to the first polarizing axis. The lens having a plurality of linear lens patterns is, for example, a lenticular lens, which is disposed between the polarizing-axis control unit and the display panel and directs the light with the first polarizing axis and the light with the second polarizing axis separated by the polarizing-axis control unit into specified directions. The first polarizing unit and the second polarizing unit are, for example, polarizing plates. Both the polarizing axis of the first polarizing unit and the polarizing axis of the second polarizing unit are substantially parallel to or perpendicular to the extension of the lens patterns. This allows the polarizing axis of the light incident on the lens to be directed to the direction substantially parallel to or perpendicular to the extension of the lens patterns. Thus, the depolarization when light passes through the lens can be prevented.

An electrooptic device according to a second aspect of the invention comprises: a display panel for displaying images; an illumination system for applying light to the display panel; a polarizing-axis control unit disposed between the illuminating system and the display panel, the control unit allowing light having a first polarizing axis of the light emitted from the illuminating system to pass through, and changing part of the light from the illuminating system into light with a second polarizing axis that is substantially orthogonal to the first polarizing axis; a lens disposed between the polarizing-axis control unit and the display panel, the lens including a plurality of linear lens patterns directing the light with the first polarizing axis and the light with the second polarizing axis separated by the polarizing-axis control unit into specified directions; a first polarizing unit disposed between the illumination system and the lens, wherein the angle of the polarizing axis formed with the direction perpendicular to the extension of the lens patterns is from 40° to 50°; a second polarizing unit disposed between the display panel and the lens, wherein the angle of the polarizing axis formed with the direction perpendicular to the extension of the lens patterns is from 40° to 50°; a first half-wave plate disposed between the first polarizing unit and the lens; and a second half-wave plate disposed between the second polarizing unit and the lens. Both the phase advancing axis of the first half-wave plate and the phase advancing axis of the second half-wave plate form an angle ranging from 17.5° to 27.5° or from 62.5° to 72.5° with the direction perpendicular to the extension of the lens patterns.

This electrooptic device further comprises a first half-wave plate and a second half-wave plate. The polarizing axes of the first polarizing unit and the second polarizing unit form an angle ranging from 40° to 50° with the extension of the lens patterns. An example of the display panel is a general liquid-crystal display panel. The first half-wave plate is disposed between the first polarizing unit and the lens. The second half-wave plate is disposed between the second polarizing unit and the lens. Both the phase advancing axis of the first half-wave plate and the phase advancing axis of the second half-wave plate form an angle ranging from 17.5° to 27.5° or from 62.5° to 72.5° with the direction perpendicular to the extension of the lens patterns. Accordingly, also when the polarizing angle of the second polarizing plate on the light-incident side of the display panel ranges from 40° to 50°, the polarizing axis of the light incident on the lens becomes substantially parallel to or perpendicular to the extension of the lens patterns. Thus, the depolarization when light passes through the lens can be prevented.

An electrooptic device according to a third aspect of the invention comprises: a display panel for displaying images; an illumination system for applying light to the display panel; a polarizing-axis control unit disposed between the illuminating system and the display panel, the control unit allowing light having a first polarizing axis of the light emitted from the illuminating system to pass through, and changing part of the light from the illuminating system into light with a second polarizing axis that is substantially orthogonal to the first polarizing axis; a lens disposed between the polarizing-axis control unit and the display panel, the lens including a plurality of linear lens patterns directing the light with the first polarizing axis and the light with the second polarizing axis separated by the polarizing-axis control unit into specified directions; a first polarizing unit disposed between the illumination system and the lens, wherein the angle of the polarizing axis formed with the direction perpendicular to the extension of the lens patterns is from 40° to 50°; a second polarizing unit disposed between the display panel and the lens, wherein the angle of the polarizing axis formed with the direction perpendicular to the extension of the lens patterns is from 130° to 140°; a first half-wave plate disposed between the first polarizing unit and the lens; and a second half-wave plate disposed between the second polarizing unit and the lens. Of the phase advancing axis of the first half-wave plate and the phase advancing axis of the second half-wave plate, one axis forms an angle ranging from 17.5° to 27.5° with the direction perpendicular to the extension of the lens patterns, and the other axis forms an angle from 62.5° to 72.5°. Accordingly, also when the polarizing angle of the second polarizing plate on the light-incident side of the display panel ranges from 130° to 140°, the polarizing axis of the light incident on the lens becomes substantially parallel to or perpendicular to the extension of the lens patterns. Thus, the depolarization when light passes through the lens can be prevented.

It is preferable that the electrooptic device be configured such that the display mode is switched between a planar display mode and a double display mode by controlling application of voltage to a plurality of electrodes.

It is preferable that the electrooptic device be configured such that the display mode is switched between a planar display mode and a stereoscopic display mode by controlling application of voltage to a plurality of electrodes.

According to a fourth aspect of the invention, there is provided an electronic device comprising the electrooptic device in the display.

BRIEF DESCRIPTION OF THE DRAWINGS

The invention will be described with reference to the accompanying drawings, wherein like numbers reference like elements.

FIG. 10 is a diagram illustrating the region of the display panel seen by the viewers during stereoscopic display.

FIG. 15A is a diagram showing the polarizing axes of the components of the image display device, as viewed from above.

FIG. 15B is a diagram showing the polarizing axes of the components of the image display device, as viewed from above.

DESCRIPTION OF EXEMPLARY EMBODIMENTS

Embodiments of the invention will be described with reference to the drawings.

First Embodiment

Figure 1:
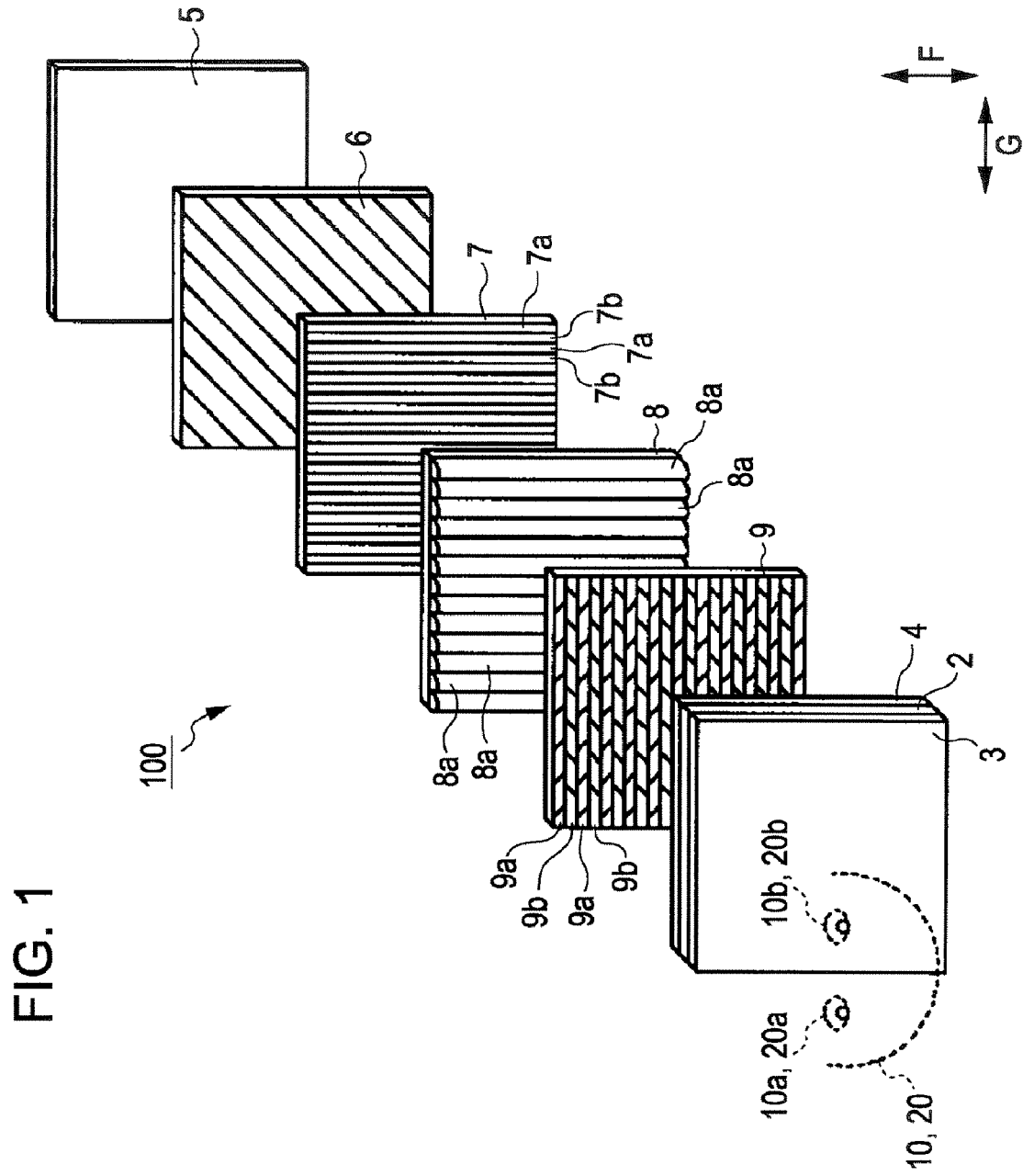
FIG. 1 is an exploded perspective view of an image display device according to a first embodiment of the invention.
Figure 2:
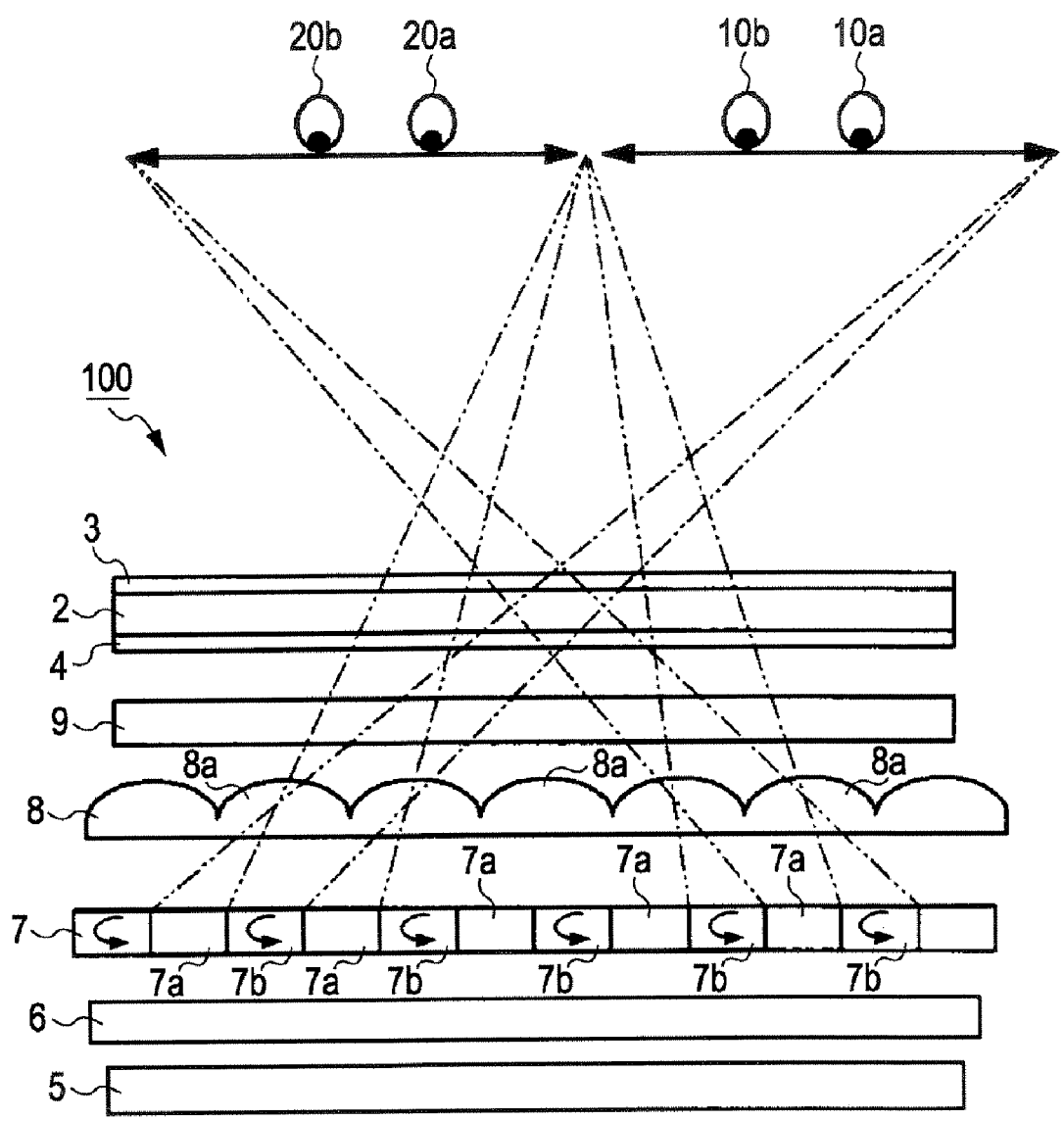
FIG. 2 is a diagram illustrating a state in which viewers see the image display device from above.
Figure 3:
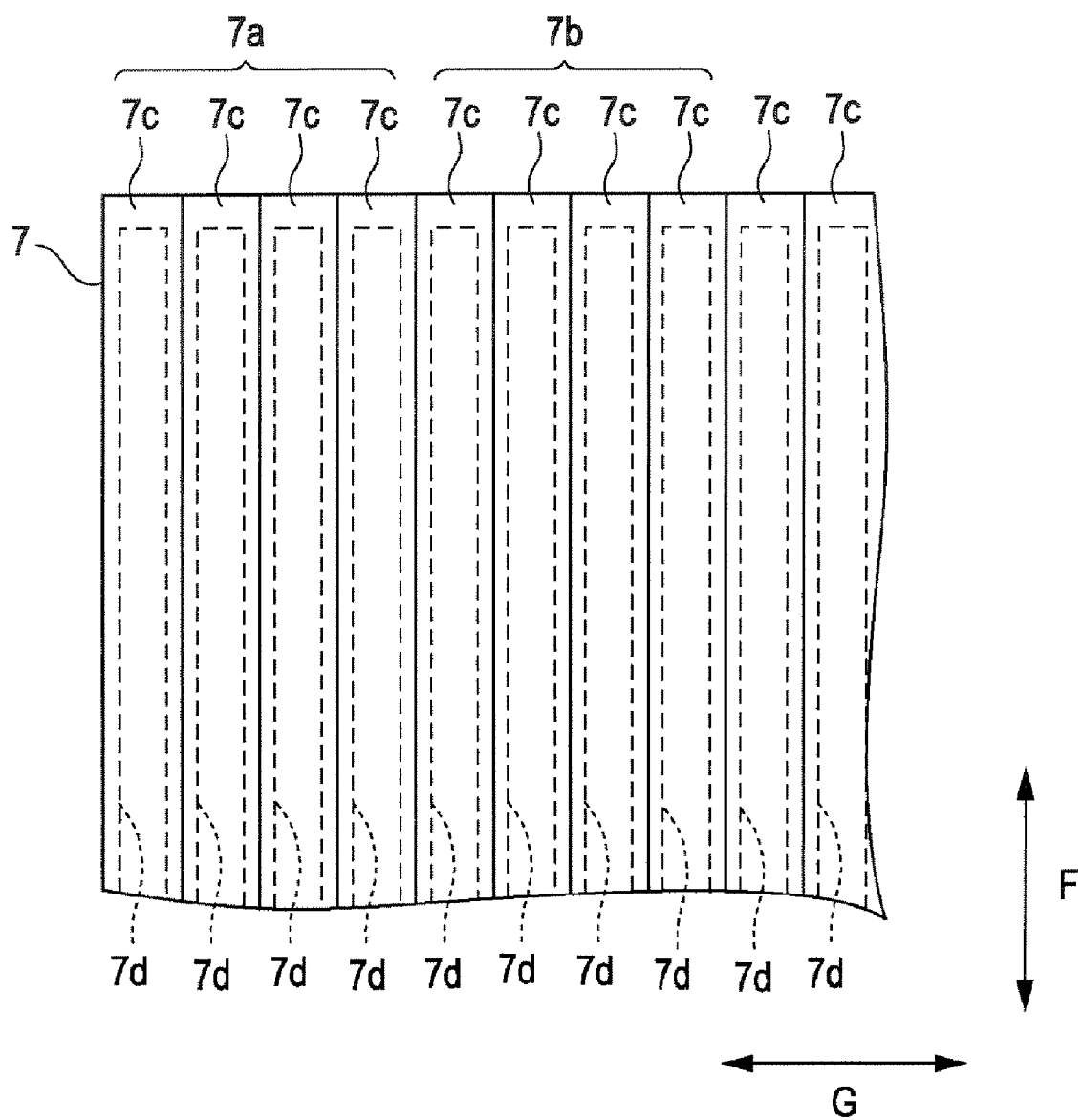
FIG. 3 is a fragmentary enlarged view of a polarization-controlling liquid crystal panel of the image display device according to the first embodiment.
Figure 4:
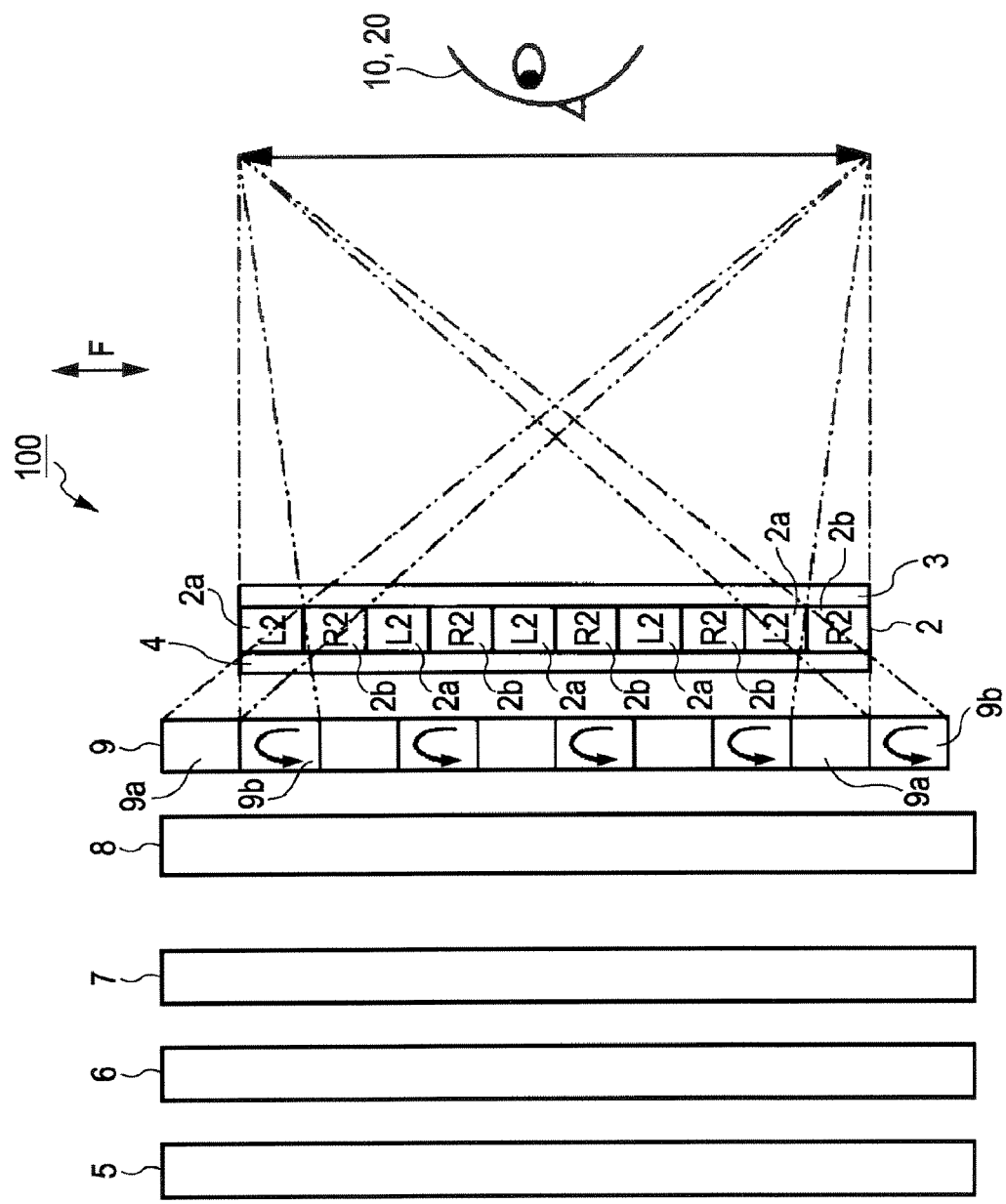
FIG. 4 is a diagram illustrating a state in which viewers see the image display device from a side.
Figure 5:
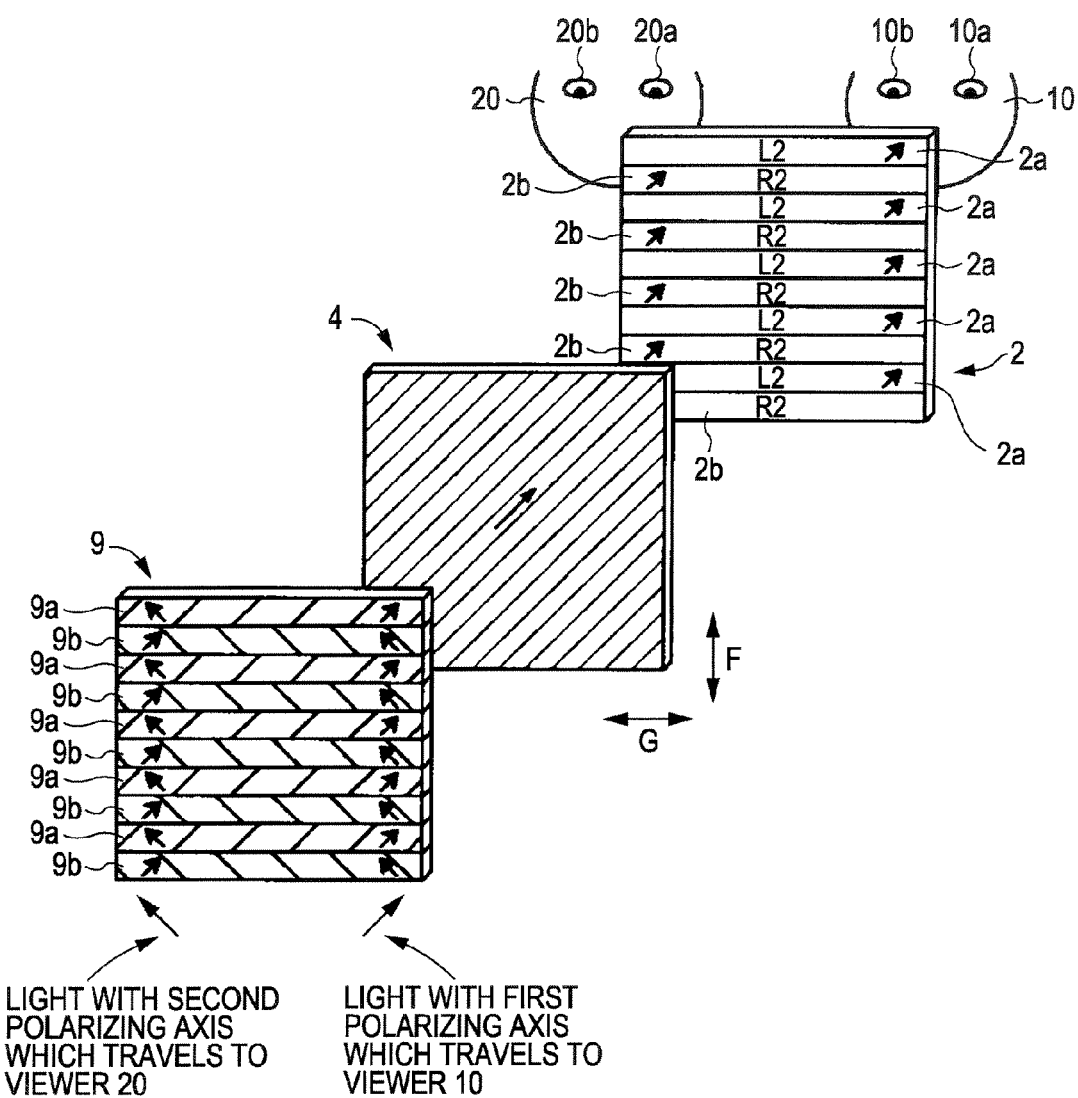
FIG. 5 is an exploded perspective view of the image display device according to the first embodiment, illustrating the principle thereof.
Figure 6:
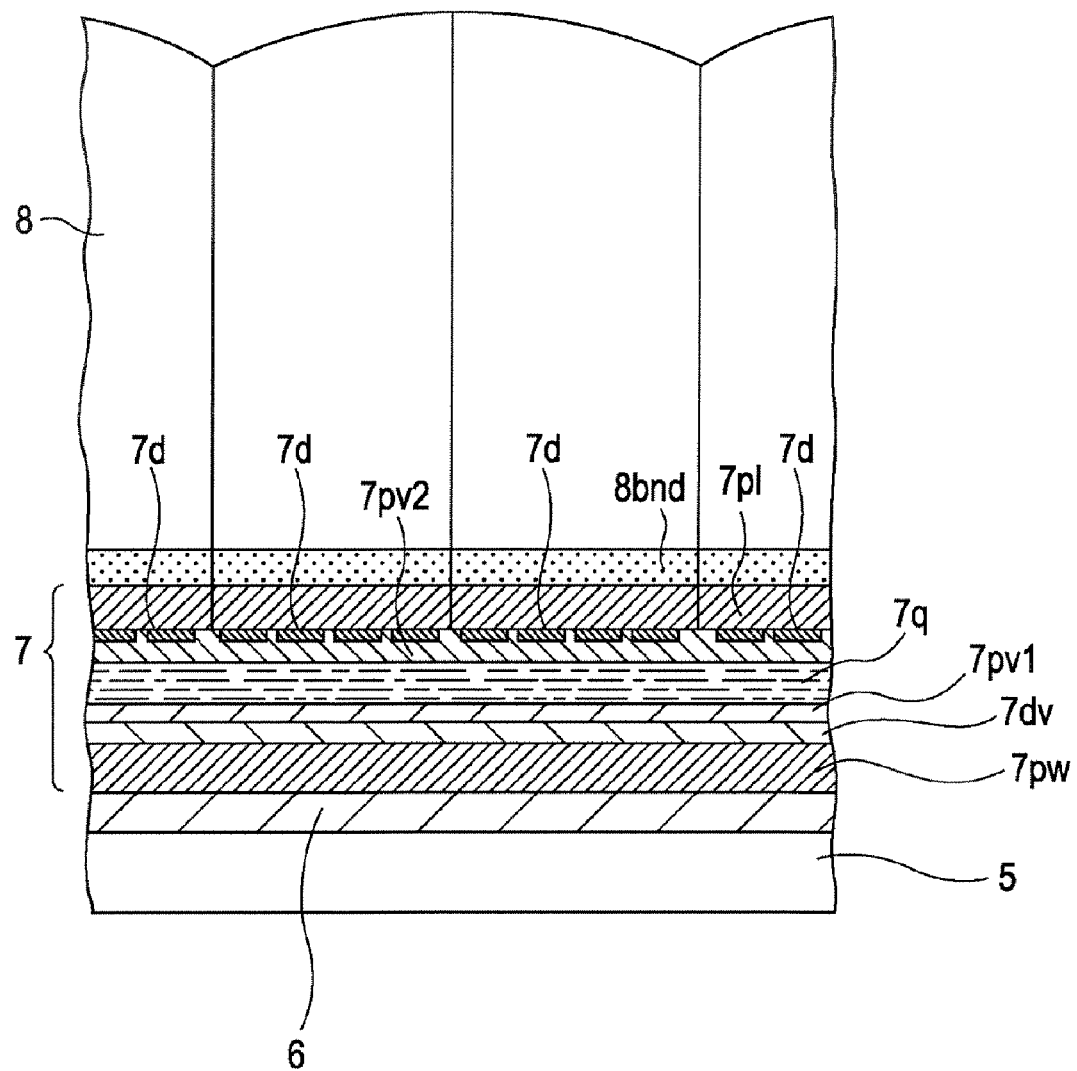
FIG. 6 is a cross-sectional view of the image display device according to the first embodiment.

FIG. 1 is an exploded perspective view of an image display device 100 according to a first embodiment of the invention; FIG. 2 is a diagram for describing the principle of the image display device 100 according to the first embodiment of FIG. 1, in which viewers see the image display device 100 from above; FIG. 3 is a fragmentary enlarged view of the polarization-controlling liquid crystal panel of the image display device 100 according to the first embodiment; FIG. 4 is a diagram for describing the principle of the image display device 100 of FIG. 1, in which viewers see the image display device 100 from a side; FIG. 5 is an exploded perspective view of the image display device 100 according to the first embodiment for describing the principle thereof; and FIG. 6 is a cross-sectional view of the image display device 100 according to the first embodiment. Referring to FIGS. 1 to 6, the structure of the image display device 100 according to the first embodiment will be described.

Referring to FIGS. 1 and 2, the image display device 100 according to the first embodiment includes a display panel 2 for displaying images, polarizing plates 3 and 4 disposed so as to sandwich the display panel 2, a backlight 5 for applying light to the display panel 2, and a polarizing plate 6 on the side of the backlight 5 adjacent to viewers 10 and 20 (see FIG. 2). The polarizing plates 3 and 4 that sandwich the display panel 2 have polarizing axes intersecting each other. The polarizing plate 4 has the function of allowing light having a first polarizing axis to pass through and absorbing light having a second polarizing axis that is substantially orthogonal to the first polarizing axis. The polarizing plate 3 has the function of allowing light having the second polarizing axis that is substantially orthogonal to the first polarizing axis and absorbing light having the first polarizing axis. The polarizing plate 6 is configured to allow light having a first polarizing axis of the light emitted from the backlight 5.

The first embodiment has a polarization-controlling liquid crystal panel 7 on the side of the polarizing plate 6 adjacent to viewers 10 and 20. The polarization-controlling liquid crystal panel 7 includes a polarization control region 7a that allows light with the first polarizing axis which is applied from the backlight 5 through the polarizing plate 6 to pass through and a polarization control region 7b that changes the light with the first polarizing axis to light with a second polarizing axis that is substantially orthogonal to the first polarizing axis. The polarization control regions 7a and 7b of the polarization-controlling liquid crystal panel 7 extend in the direction substantially orthogonal to the line segment that connects the left eye 10a (20a) and the right eye 10b (20b) of the viewer 10 (20) (in the direction vertical to the plane of FIG. 2 or in the direction F in FIG. 1) and are provided alternately in the direction G. The polarization control regions 7a and 7b each include a plurality of (e.g., four) unit regions 7c of the polarization-controlling liquid crystal panel 7 (see FIG. 3). As shown in FIG. 3, the unit regions 7c of the polarization control regions 7a and 7b each have an electrode 7d. For double display, to be described later, voltage is applied to the four electrodes 7d of the four unit regions 7c of the polarization control region 7a, and no voltage is applied to the four electrodes 7d of the four unit regions 7c of the polarization control region 7b. In the first embodiment, the widths of the polarization control regions 7a and 7b can be varied freely by controlling the application of voltage to the electrodes 7d of the unit regions 7c. For example, for stereoscopic display and planar-image display, which will be described later, the polarization control regions 7a and 7b are configured to each include two unit regions 7c, and voltage is applied to the two electrodes 7d of the two unit regions 7c of the polarization control region 7a, and no voltage is applied to the two electrodes 7d of the two unit regions 7c of the polarization control region 7b. Thus, the polarization control regions 7a and 7b can each have a width corresponding to the two unit regions 7c. This facilitates switching among a double display mode, a stereoscopic display mode, and a planar display mode by controlling application of voltage to the electrodes 7d of the polarization-controlling liquid crystal panel 7.

As shown in FIGS. 1 and 2, the first embodiment has a lenticular lens 8 on the side of the polarization-controlling liquid crystal panel 7 adjacent to the viewers 10 and 20. The lenticular lens 8 has a plurality of substantially semicolumnar lens patterns 8a extending along the direction F in FIG. 1. The lenticular lens 8 including the lens patterns 8a has the function of directing the light separated so as to have different polarizing axes by the polarization-controlling liquid crystal panel 7 toward the viewers 10 and 20.

The first embodiment further has a retardation film 9 between the lenticular lens 8 and the polarizing plate 4 mounted to the display panel 2. The retardation film 9 includes a transmitting region 9a that allows light with the first polarizing axis to pass through and a polarizing region 9b that changes light with the first polarizing axis to light with the second polarizing axis. As shown in FIGS. 1 and 5, the transmitting region 9a and the polarizing region 9b extend in the direction G that is substantially orthogonal to the direction F and are disposed alternately in the direction F.

In the first embodiment, referring to FIGS. 4 and 5, the display panel 2 has pixel rows 2a and 2b extending in the direction G (see FIG. 5) and disposed alternately in the direction F. The pixel rows 2a and 2b of the display panel 2 correspond to the transmitting region 9a and the polarizing region 9b extending in the direction G at the retardation film 9. As shown in FIGS. 1 and 2, the polarizing plate 6, the polarization-controlling liquid crystal panel 7, the lenticular lens 8, the retardation film 9, and the polarizing plate 4 are disposed between the display panel 2 and the backlight 5.

Referring now to FIG. 6, the cross-sectional structure of the image display device 100 according to the first embodiment, particularly, of the polarization-controlling liquid crystal panel 7 will be described in more detail. As shown in FIG. 6, the polarization-controlling liquid crystal panel 7 is disposed between the lenticular lens 8 and the polarizing plate 6, and is bonded to the lenticular lens 8 with a transparent adhesive 8bnd. The polarization-controlling liquid crystal panel 7 has a liquid crystal layer 7q between a light-exiting-side substrate 7pl and a light-incident-side substrate 7pw. The light-exiting-side substrate 7pl has the stripe electrodes 7d on the inner surface of the light-exiting-side substrate 7pl and an alignment film 7pv2 on the whole surface thereof, and has electrodes 7dv on the whole inner surface of the light-incident-side substrate 7pw, over which an alignment film 7pvl is disposed.

Double Display Mode

Figure 7:
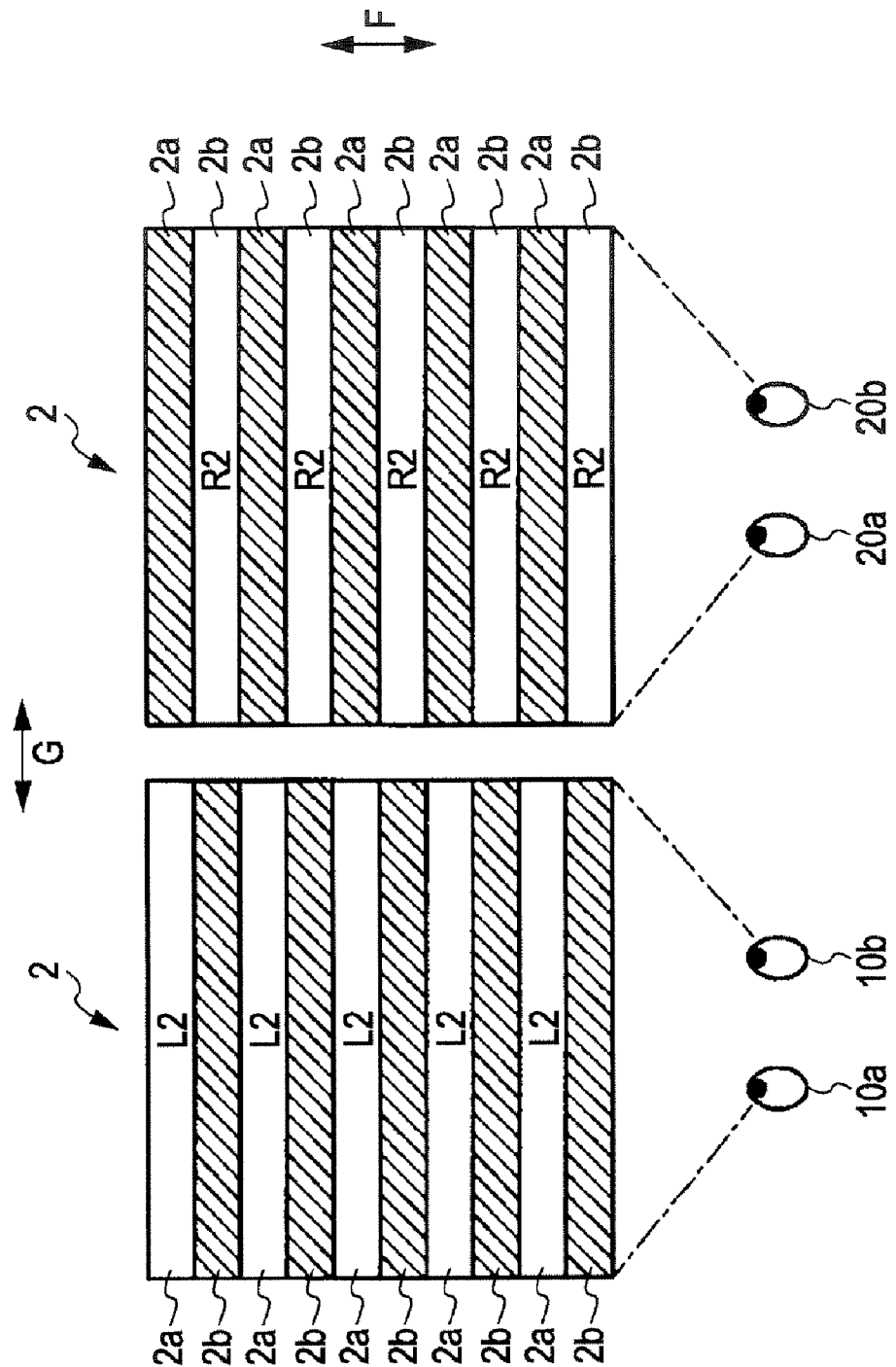
FIG. 7 is a diagram illustrating the region of the display panel seen by the viewers during double display.

FIG. 7 is a diagram illustrating the region of the display panel 2 seen by the viewers during double display of the image display device 100 according to the first embodiment. Referring to FIGS. 2 and 4 to 7, a method for double display of the image display device 100 of the first embodiment will be described.

Referring to FIGS. 2 and 5, the structures of the polarization-controlling liquid crystal panel 7 and the display panel 2 for presenting different images to the viewers 10 and 20 in different positions will be described. As shown in FIG. 2, the image display device 100 of the first embodiment during double display has a pair of the polarization control regions 7a and 7b of the polarization-controlling liquid crystal panel 7 for each lens pattern 8a of the lenticular lens 8. That is, during double display, the application of voltage is varied every four electrodes 7d of the polarization-controlling liquid crystal panel 7, as described above, thus constructing the polarization control regions 7a and 7b of the polarization-controlling liquid crystal panel 7 each composed of four unit regions 7c (see FIG. 3). As shown in FIG. 5, the pixel rows 2a of the display panel 2 display an image L2 (e.g., a TV image) for the viewer 10, while the pixel rows 2b display an image R2 (e.g., a car navigation image) for the viewer 20.

With the above structure, of the light applied from the backlight 5, only light with the first polarizing axis passes through the polarizing plate 6 adjacent to the viewers 10 and 20 with respect to the backlight 5, and travels to the polarization-controlling liquid crystal panel 7. Thus, the light with the first polarizing axis passes through the polarization control regions 7a and 7b of the polarization-controlling liquid crystal panel 7. At that time, the light incident on the polarization control region 7a of the polarization-controlling liquid crystal panel 7 passes therethrough, without its polarizing axis changed, while the light incident on the polarization control region 7b of the polarization-controlling liquid crystal panel 7 exits therefrom, with its polarizing axis changed substantially by 90° (to the second polarizing axis). Then, as shown in FIG. 2, the light that has exited from the polarization control region 7a while having the first polarizing axis is condensed by the lenticular lens 8 so as to travel toward the viewer 10. The light that has exited from the polarization control region 7b while having the second polarizing axis is condensed by the lenticular lens 8 so as to travel toward the viewer 20.

As shown in FIG. 5, the light with the first polarizing axis which travels toward the viewer 10 enters the retardation film 9 including the transmitting region 9a and the polarizing region 9b. The light with the first polarizing axis passes through the transmitting region 9a and the polarizing region 9b. At that time, the light that has passed through the transmitting region 9a of the retardation film 9 exits therefrom without its polarizing axis changed, while the light incident on the polarizing region 9b exits therefrom with its polarizing axis changed substantially by 90° (to the second polarizing axis). Then, the light with the first polarizing axis which exits from the transmitting region 9a of the retardation film 9 and travels toward the viewer 10 enters the polarizing plate 4 between the display panel 2 and the retardation film 9, and passes through the polarizing plate 4 into the pixel rows 2a of the display panel 2. In contrast, the light that exits from the polarizing region 9b of the retardation film 9 while having the second polarizing axis that is substantially orthogonal to the first polarizing axis and travels toward the viewer 10 enters the polarizing plate 4 between the display panel 2 and the retardation film 9, and is absorbed therein. Thus, the light that has passed through the pixel rows 2b of the display panel 2 which displays the image R2 for the viewer 20 does not reach the viewer 10. Therefore, the viewer 10 cannot see the image R2 for the viewer 20 which is displayed by the pixel rows 2b of the display panel 2 because the light that has passed through the pixel rows 2b of the display panel 2 on which the image R2 for the viewer 20 is displayed does not reach the viewer 10. Thus, as shown in FIG. 7, the viewer 10 can see the image L2 for the viewer 10 displayed by the pixel rows 2a of the display panel 2.

As shown in FIG. 5, the light with the second polarizing axis which travels toward the viewer 20 enters the retardation film 9 having the transmitting region 9a and the polarizing region 9b. The light having the second polarizing axis that is substantially orthogonal to the first polarizing axis passes through the transmitting region 9a and the polarizing region 9b. At that time, the light that has passed through the transmitting region 9a of the retardation film 9 exits therefrom without its polarizing axis changed, while the light incident on the polarizing region 9b exits therefrom with its polarizing axis changed substantially by 90° (to the first polarizing axis). Then, the light having the second polarizing axis that is substantially orthogonal to the first polarizing axis and that has exited from the transmitting region 9a of the retardation film 9 toward the viewer 20 enters the polarizing plate 4 between the display panel 2 and the retardation film 9, and is absorbed therein. Therefore, the viewer 20 cannot see the image L2 for the viewer 10 which is displayed by the pixel rows 2a of the display panel 2 because the light that has passed through the pixel rows 2a of the display panel 2 on which the image L2 for the viewer 10 is displayed does not reach the viewer 20. In contrast, the light that exits from the polarizing region 9b of the retardation film 9 and travels toward the viewer 20 enters the polarizing plate 4 between the display panel 2 and the retardation film 9, and passes through the polarizing plate 4 into the pixel rows 2b of the display panel 2. Thus, as shown in FIG. 7, the viewer 20 can see the image R2 for the viewer 20 displayed by the pixel rows 2b of the display panel 2.

Stereoscopic Display Mode

Figure 8:
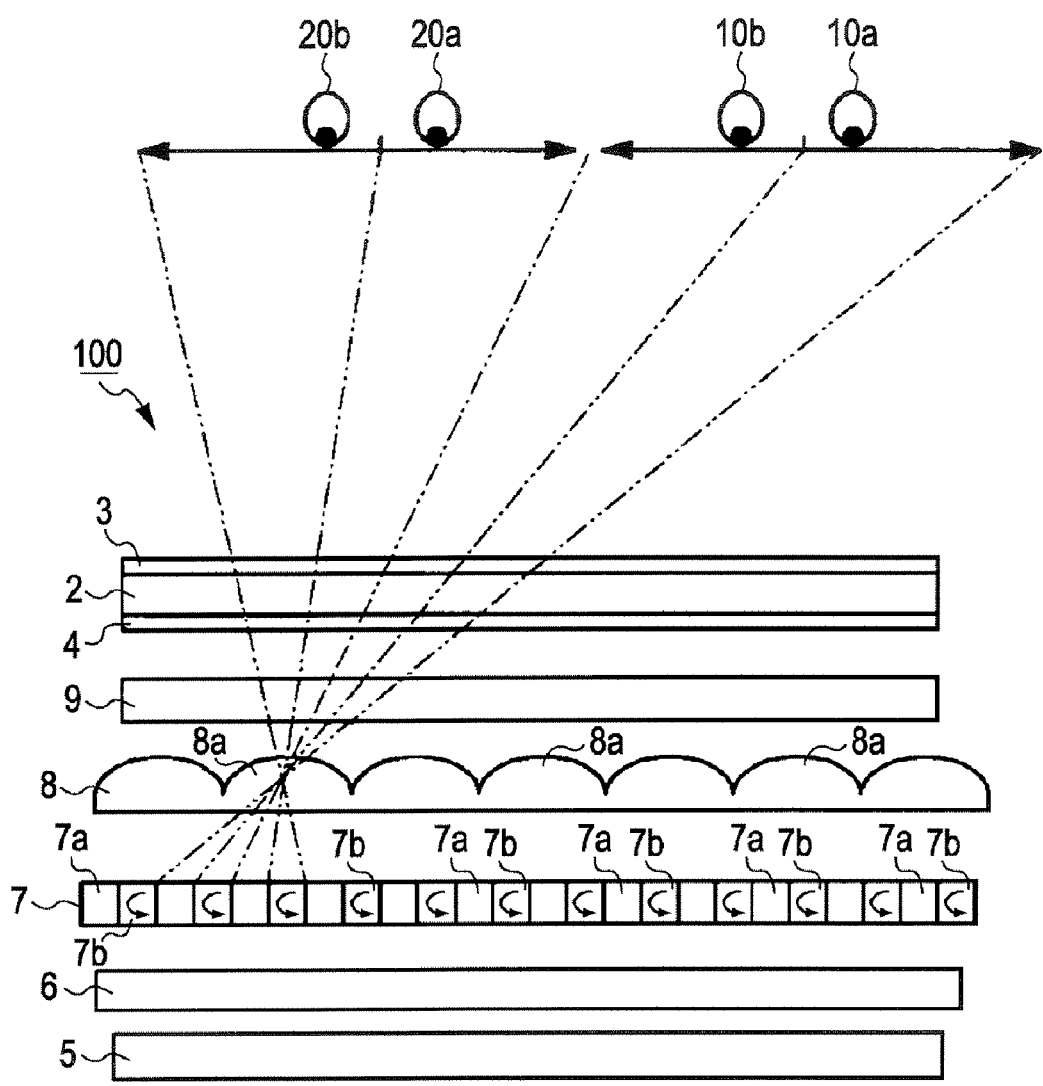
FIG. 8 is a diagram illustrating a state in which viewers see the image display device from above.
Figure 9:
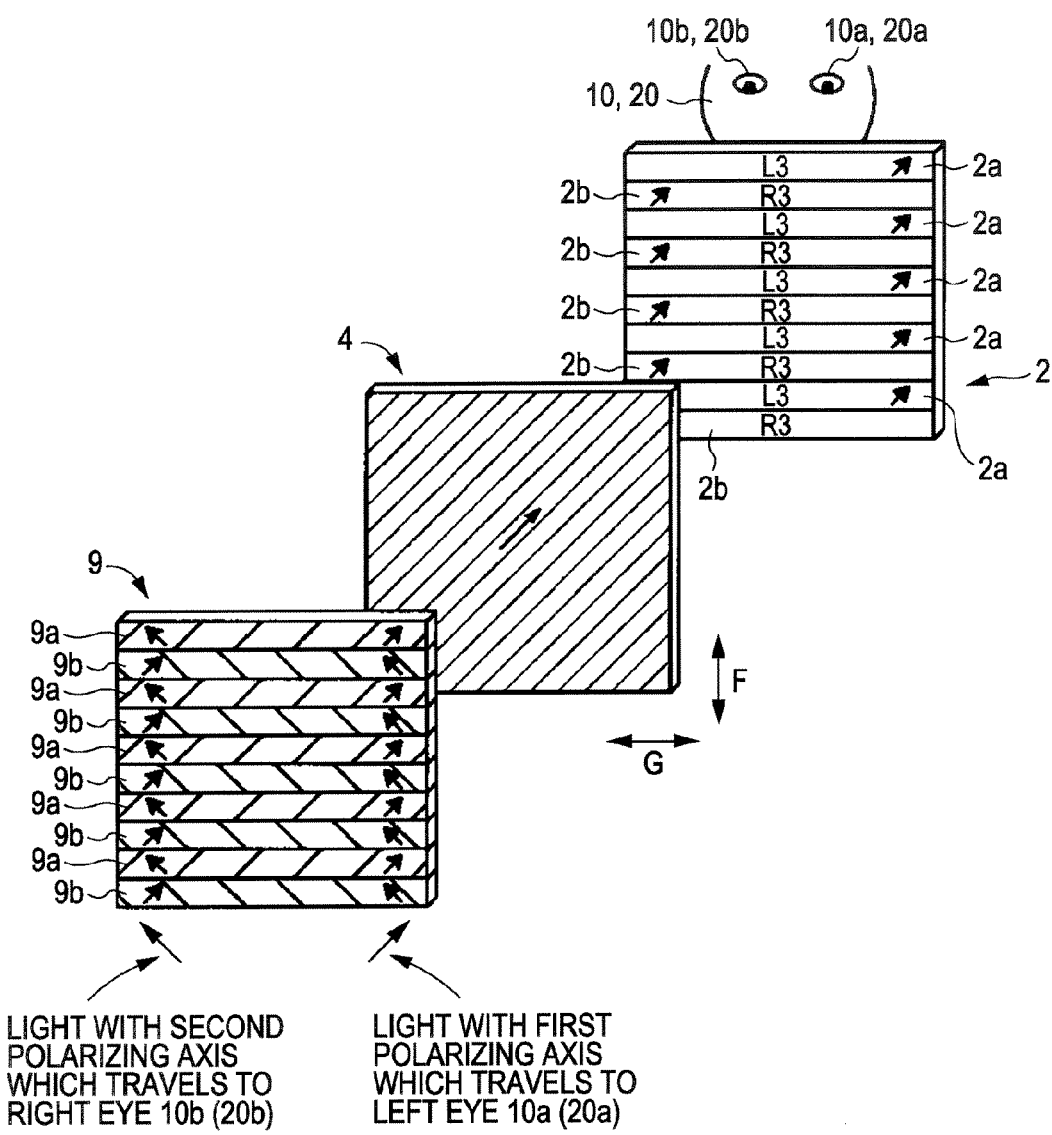
FIG. 9 is an exploded perspective view of the image display device for describing the principle of stereoscopic display.

FIG. 8 is a diagram for describing the principle of the stereoscopic display of the image display device 100 according to the first embodiment in FIG. 1, in which viewers see the image display device 100 from above; FIG. 9 is an exploded perspective view of the image display device 100 for describing the principle of stereoscopic display; and FIG. 10 is a diagram illustrating the region of the display panel seen by the viewers during stereoscopic display of the image display device 100 according to the first embodiment. Referring then to FIGS. 8 to 10, a method for stereoscopic display of the image display device 100 according to the first embodiment will be described.

The structure of the polarization-controlling liquid crystal panel 7 and the display panel 2 for presenting 3D images to the viewers 10 and 20 in different positions will be described. As shown in FIG. 8, the image display device 100 has two pairs of the polarization control regions 7a and 7b of the polarization-controlling liquid crystal panel 7 for each lens pattern 8a of the lenticular lens 8. That is, for stereoscopic display, the application of voltage is varied every two electrodes 7d of the polarization-controlling liquid crystal panel 7, as described above, thus constructing the polarization control regions 7a and 7b of the polarization-controlling liquid crystal panel 7 each composed of two unit regions 7c (see FIG. 3). Thus, the display mode is switched from the double display mode to the stereoscopic display mode. As shown in FIG. 9, the pixel rows 2a of the display panel 2 display an image L3 for the left eye 10a of the viewer 10 and the left eye 20a of the viewer 20, while the pixel rows 2b display an image R3 for the right eye 10b of the viewer 10 and the right eye 20b of the viewer 20.

With the above structure, of the light applied from the backlight 5, only light with the first polarizing axis passes through the polarizing plate 6 adjacent to the viewers 10 and 20 with respect to the backlight 5, and travels to the polarization-controlling liquid crystal panel 7. The light with the first polarizing axis passes through the polarization control regions 7a and 7b of the polarization-controlling liquid crystal panel 7. At that time, the light incident on the polarization control region 7a of the polarization-controlling liquid crystal panel 7 passes therethrough, without its polarizing axis changed, while the light incident on the polarization control region 7b of the polarization-controlling liquid crystal panel 7 exits, with its polarizing axis changed substantially by 90° (to the second polarizing axis). Then, the light that has exited from the polarization control region 7a while having the first polarizing axis is condensed by the lenticular lens 8 so as to travel toward the left eye 10a of the viewer 10 and the left eye 20a of the viewer 20. The light that has exited from the polarization control region 7b while having the second polarizing axis that is substantially orthogonal to the first polarizing axis is condensed by the lenticular lens 8 so as to travel toward the right eye 10b of the viewer 10 and the right eye 20b of the viewer 20.

As shown in FIG. 9, the light with the first polarizing axis, which travels toward the left eye 10a of the viewer 10 and the left eye 20a of the viewer 20, enters the retardation film 9 including the transmitting region 9a and the polarizing region 9b. The light with the first polarizing axis passes through the transmitting region 9a and the polarizing region 9b. At that time, the light that has passed through the transmitting region 9a of the retardation film 9 exits therefrom, without its polarizing axis changed, while the light incident on the polarizing region 9b exits therefrom, with its polarizing axis changed substantially by 90° (to the second polarizing axis). Then, the light with the first polarizing axis, which exits from the transmitting region 9a of the retardation film 9 and travels toward the left eye 10a of the viewer 10 and the left eye 20a of the viewer 20, enters the polarizing plate 4 between the display panel 2 and the retardation film 9, and passes through the polarizing plate 4 into the pixel rows 2a of the display panel 2. In contrast, the light that has exited from the polarizing region 9b of the retardation film 9 while having the second polarizing axis that is substantially orthogonal to the first polarizing axis and that travels toward the left eye 10a of the viewer 10 and the left eye 20a of the viewer 20 enters the polarizing plate 4 between the display panel 2 and the retardation film 9, and is absorbed therein. Thus, the light that has passed through the pixel rows 2b of the display panel 2 in which the image R3 for the right eye does not reach the left eye 10a of the viewer 10 and the left eye 20a of the viewer 20. Therefore, the left eye 10a of the viewer 10 and the left eye 20a of the viewer 20 cannot see the image R3 for the right eye which is displayed by the pixel rows 2b of the display panel 2. Thus, as shown in FIG. 10, the image L3 for the left eye displayed by the pixel rows 2a of the display panel 2 enters the left eye 10a of the viewer 10 and the left eye 20a of the viewer 20.

Figure 11A:
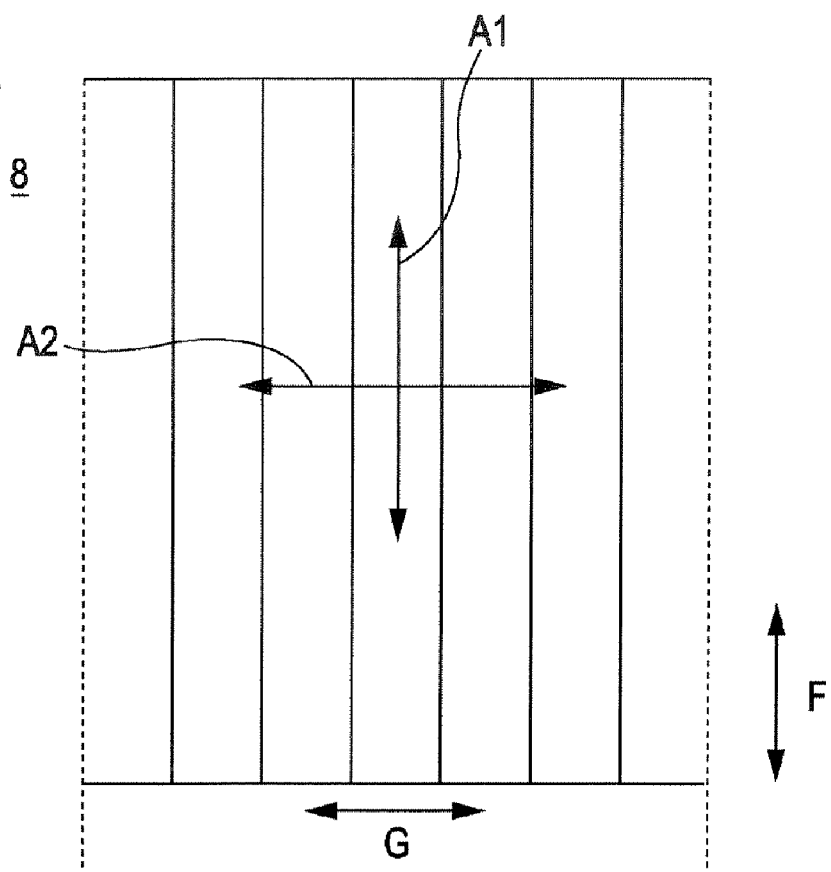
FIG. 11A is a schematic plan view of a lenticular lens.
Figure 11B:
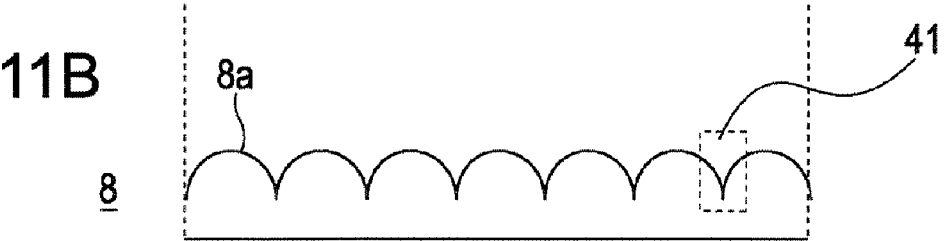
FIG. 11B is a cross-sectional view of the lenticular lens.

As shown in FIG. 9, the light with the second polarizing axis which travels toward the right eye 10b of the viewer 10 and the right eye 20b of the viewer 20 enters the retardation film 9 having the transmitting region 9a and the polarizing region 9b. The light having the second polarizing axis passes through the transmitting region 9a and the polarizing region 9b of the retardation film 9. At that time, the light that has passed through the transmitting region 9a exits therefrom without its polarizing axis changed, while the light incident on the polarizing region 9b exits therefrom with its polarizing axis changed substantially by 90° (to the first polarizing axis). Then, the light with the second polarizing axis which has exited from the transmitting region 9a and travels toward the right eye 10b of the viewer 10 and the right eye 20b of the viewer 20 enters the polarizing plate 4 between the display panel 2 and the retardation film 9, and is absorbed therein. Therefore, the light that has passed through the pixel rows 2a of the display panel 2 on which the image L3 for the left eye does not reach the right eye 10b of the viewer 10 and the right eye 20b of the viewer 20. Therefore, the right eye 10b of the viewer 10 and the right eye 20b of the viewer 20 cannot see the image L3 for the left eye, which is displayed by the pixel rows 2a of the display panel 2. In contrast, the light with the first polarizing axis which has exited from the polarizing region 9b of the retardation film 9 and travels toward the right eye 10b of the viewer 10 and the right eye 20b of the viewer 20 enters the polarizing plate 4 between the display panel 2 and the retardation film 9, and passes through the polarizing plate 4 into the pixel rows 2b of the display panel 2. Thus, as shown in FIG. 10, the image R3 for the right eye which is displayed by the pixel rows 2b of the display panel 2 enters the right eye 10b of the viewer 10 and the right eye 20b of the viewer 20. Thus, the image L3 for the left eye and the image R3 for the right eye having binocular parallax enter the left eye and the right eye of the viewers 10 and 20, respectively, as described above. Therefore, the viewers 10 and 20 can see stereoscopic images. Depolarization by Lenticular Lens FIGS. 11A and 11B are schematic diagrams of the lenticular lens 8, of which FIG. 11A is a plan view of the lenticular lens 8, as viewed from the top, and FIG. 11B is a cross-sectional view of the lenticular lens 8.

The lenticular lens 8 has the plurality of substantially semi-columnar lens patterns 8a extending along the direction F in FIG. 1. The lenticular lens 8 including the lens patterns 8a has the function of directing the light separated so as to have different polarizing axes by the polarization-controlling liquid crystal panel 7 toward the viewers 10 and 20.

However, the lenticular lens 8 has the problem of double refraction due to the distortion of the lens patterns 8a and scattering of light at the boundary 41 of the lens patterns 8a. Thus, the lenticular lens 8 generates depolarization in which the polarizing characteristic of the light incident on the lenticular lens 8 is eliminated by the double refraction or the scattering of light. When such depolarization occurs, the light that exits from the lenticular lens 8 is not sufficiently polarized.

To prevent such depolarization, it is preferable to direct the polarizing axis of the light incident on the lenticular lens 8 in the direction substantially parallel to the extension of the lens patterns 8a, that is, in the direction F (a polarizing axis A1), or in the direction substantially perpendicular to the extension of the lens patterns 8a, that is, in the direction G (a polarizing axis A2).

Figure 12A:
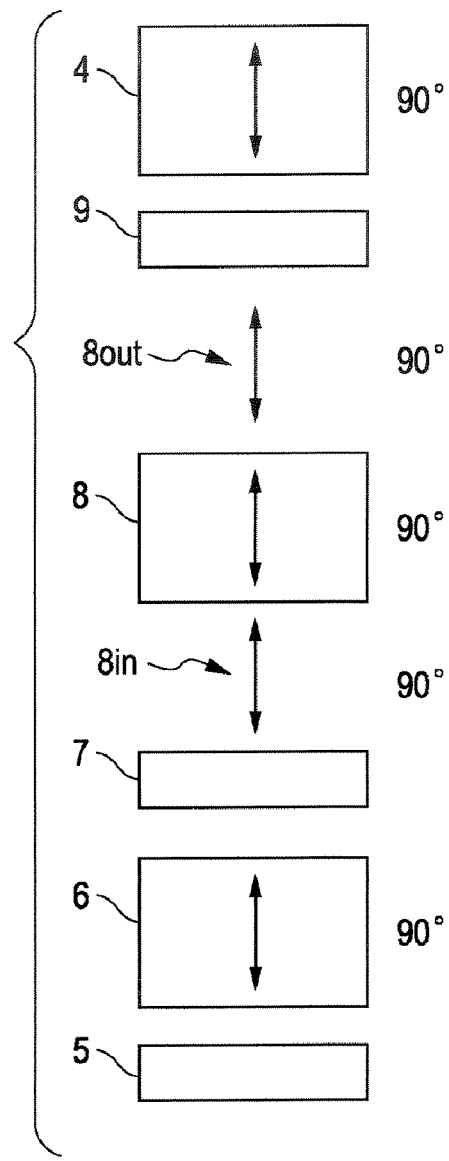
FIG. 12A is a diagram showing the polarizing axes of the components of the image display device, as viewed from above.
Figure 12B:
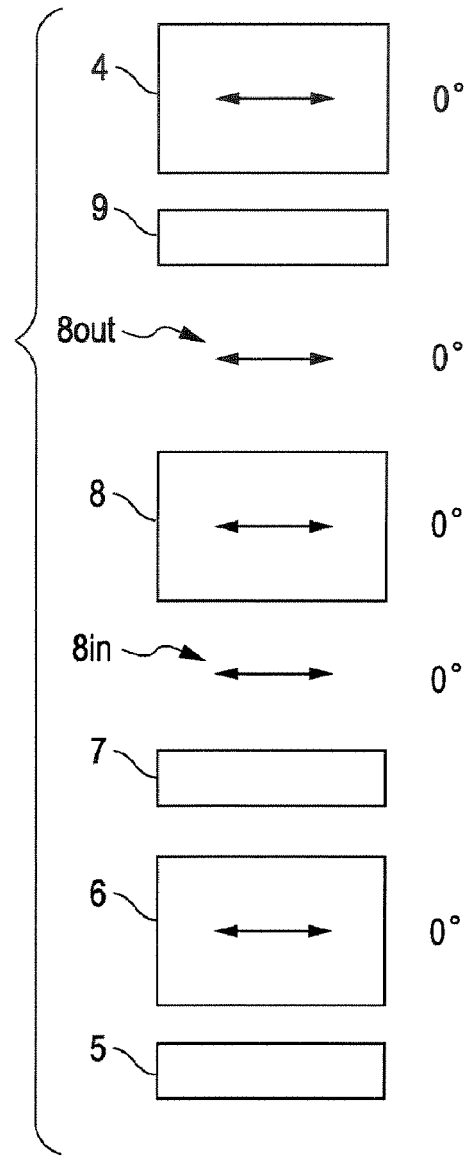
FIG. 12B is a diagram showing the polarizing axes of the components of the image display device, as viewed from above.

FIGS. 12A and 12B are diagrams showing the polarizing axes of the components of the image display device 100 according to the first embodiment, as viewed from above. The polarizing axes of FIGS. 12A and 12B are polarizing axes of the light from the polarization control region 7a of the lights with different polarizing axes separated by the polarization-controlling liquid crystal panel 7, that is, polarizing axes of the light with the first polarizing axis which has passed therethrough without its polarizing axes changed.

FIGS. 12A and 12B show the angles of the polarizing axes of the components with respect to the direction G (hereinafter, simply referred to as polarizing angles) together with arrows indicative of the directions of the polarizing axes of the light in the components. The polarizing angles are ideal angles, which are not strictly limited to those, and substantially include angles at which the same effects are offered, that is, in the range of ±5° from the following angles. For the backlight 5, the polarization-controlling liquid crystal panel 7, and the retardation film 9, only their positions are expressed as rectangles without their polarizing axes shown.

FIG. 12A shows the image display device 100 according to the first embodiment in which the polarizing angle of the polarizing plate 4 on the light-incident side of the display panel 2 is 90°, and the polarizing angle of the polarizing plate 6 is also 90°.

As shown in FIG. 12A, the light emitted from the backlight 5 is polarized to have a polarizing angle of 90° by the polarizing plate 6. Of the light separated to have different polarizing axes by the polarization-controlling liquid crystal panel 7, the light exiting from the polarization control region 7a, that is, the light with the first polarizing axis which has passed therethrough, without its polarizing axis changed, enters the lenticular lens 8 at an polarizing angle of 90°, as indicated by a polarizing axis 8in. The light with the first polarizing axis which is incident on the lenticular lens 8 exits from the lenticular lens 8, its polarizing angle held at 90°, as shown by a polarizing axis 8out. Of the light with the first polarizing axis which has exited from the lenticular lens 8, only the light that has passed through the retardation film 9 with its polarizing angle unchanged can pass through the polarizing plate 4 with its polarizing angle set at 90°.

On the other hand, of the light separated by the polarization-controlling liquid crystal panel 7 so as to have different polarizing axes, the light that exits from the polarization control region 7b, that is, the light with its polarizing angle changed to 0° and having the second polarizing axis that is substantially orthogonal to the first polarizing axis enters the lenticular lens 8, with its polarizing angle at 0°. The light with the second polarizing axis which is incident on the lenticular lens 8 exits from the lenticular lens 8, with its polarizing angle held at 0°. The light with the second polarizing axis which has exited from the lenticular lens 8 enters the retardation film 9. Of the light with the second polarizing axis which is incident on the retardation film 9, only the light whose polarizing angle is changed to 90° by the retardation film 9 can pass through the polarizing plate 4 with its polarizing angle set at 90°.

FIG. 12B shows the image display device 100 of the first embodiment in which the polarizing angle of the polarizing plate 4 on the light-incident side of the display panel 2 is 0°, and the polarizing angle of the polarizing plate 6 is also 0°.

As shown in FIG. 12B, the light emitted from the backlight 5 is polarized to have a polarizing angle of 0° by the polarizing plate 6. Of the light separated to have different polarizing axes by the polarization-controlling liquid crystal panel 7, the light exiting from the polarization control region 7a, that is, the light with the first polarizing axis which has passed therethrough, without its polarizing axis changed, enters the lenticular lens 8 at an polarizing angle of 0°, as indicated by a polarizing axis 8in. The light with the first polarizing axis which is incident on the lenticular lens 8 exits from the lenticular lens 8, with its polarizing angle held at 0°, as indicated by a polarizing axis 8out. Of the light with the first polarizing axis which has exited from the lenticular lens 8, only the light that has passed through the retardation film 9 with its polarizing angle unchanged can pass through the polarizing plate 4 with its polarizing angle set and the image R3 for the right eye at 0°.

On the other hand, of the light separated by the polarization-controlling liquid crystal panel 7 so as to have different polarizing axes, the light that exits from the polarization control region 7b, that is, the light with its polarizing angle changed to 90° and having the second polarizing axis that is substantially orthogonal to the first polarizing axis enters the lenticular lens 8, with its polarizing angle at 90°. The light with the second polarizing axis which is incident on the lenticular lens 8 exits from the lenticular lens 8 with its polarizing angle held at 90°. The light with the second polarizing axis which has exited from the lenticular lens 8 enters the retardation film 9. Of the light with the second polarizing axis which is incident on the retardation film 9, only the light whose polarizing angle has been changed to 0° by the retardation film 9 can pass through the polarizing plate 4 whose polarizing angle is set at 0°.

With the image display device 100 according to the first embodiment, both the polarizing axes of the polarizing plate 4 and the polarizing plate 6 are substantially parallel to or perpendicular to the extension of the lens patterns 8a, as described above. Thus, the polarizing axis of the light incident on the lenticular lens 8 becomes substantially parallel to or perpendicular to the extension of the lens patterns 8a. This prevents the depolarization of light that passes through the lenticular lens 8.

Second Embodiment

Figure 13:
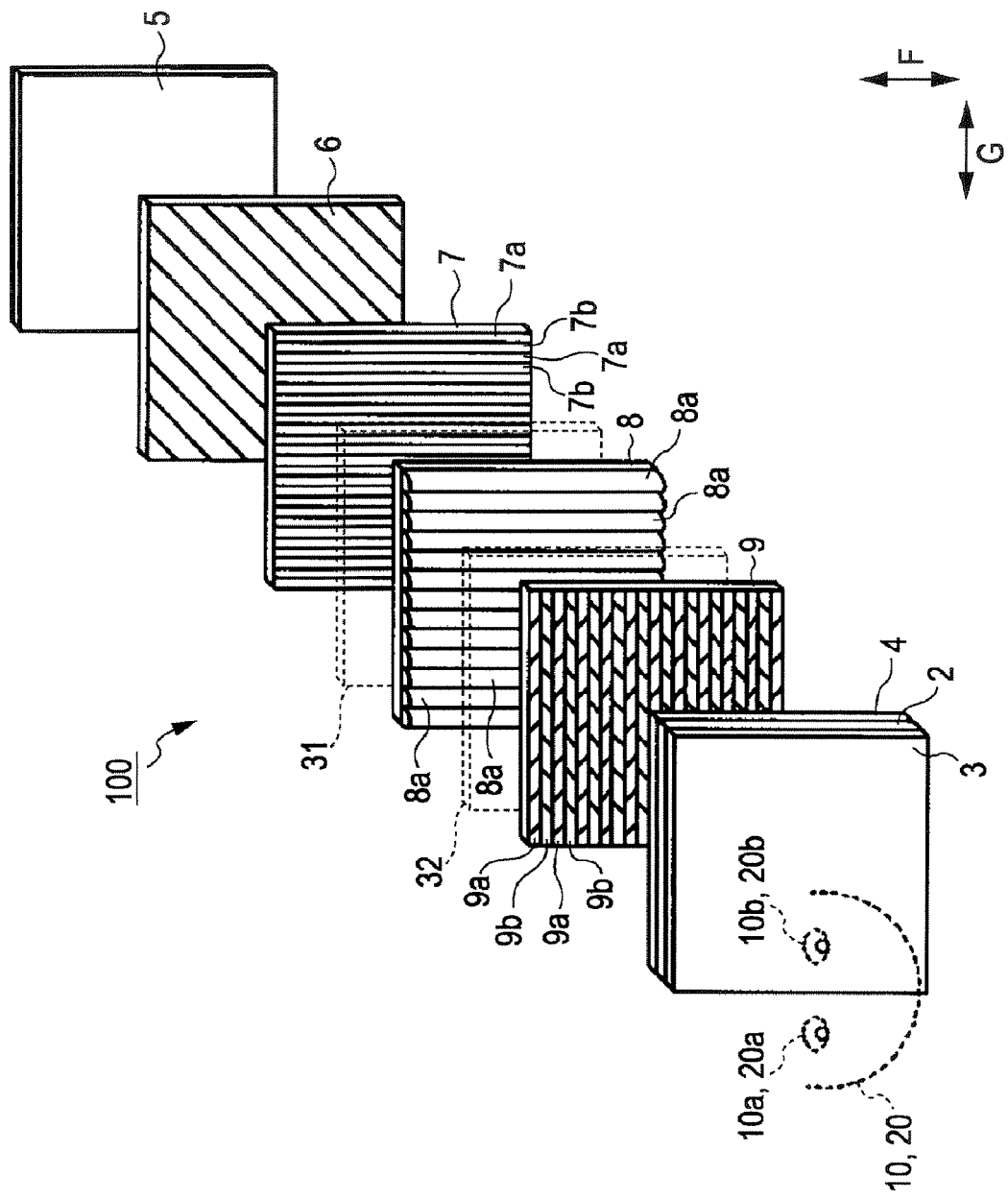
FIG. 13 is an exploded perspective view of an image display device according to a second embodiment.

An image display device 100 according to a second embodiment of the invention will be described. FIG. 13 is an exploded perspective view of the image display device 100.

The image display device 100 according to the second embodiment has substantially the same structure and the same system of the double display mode and the stereoscopic display mode as those of the image display device 100 according to the first embodiment shown in FIGS. 1 to 10. As shown in FIG. 13, the image display device 100 according to the second embodiment is different from the image display device 100 of the first embodiment in that it includes a half-wave plate 31 between the polarizing plate 6 and the lenticular lens 8 and a half-wave plate 32 between the lenticular lens 8 and the polarizing plate 4, in other word, it includes the half-wave plates 31 and 32 on the light-incident side and the light-exiting side of the lenticular lens 8, respectively.

Figure 14:
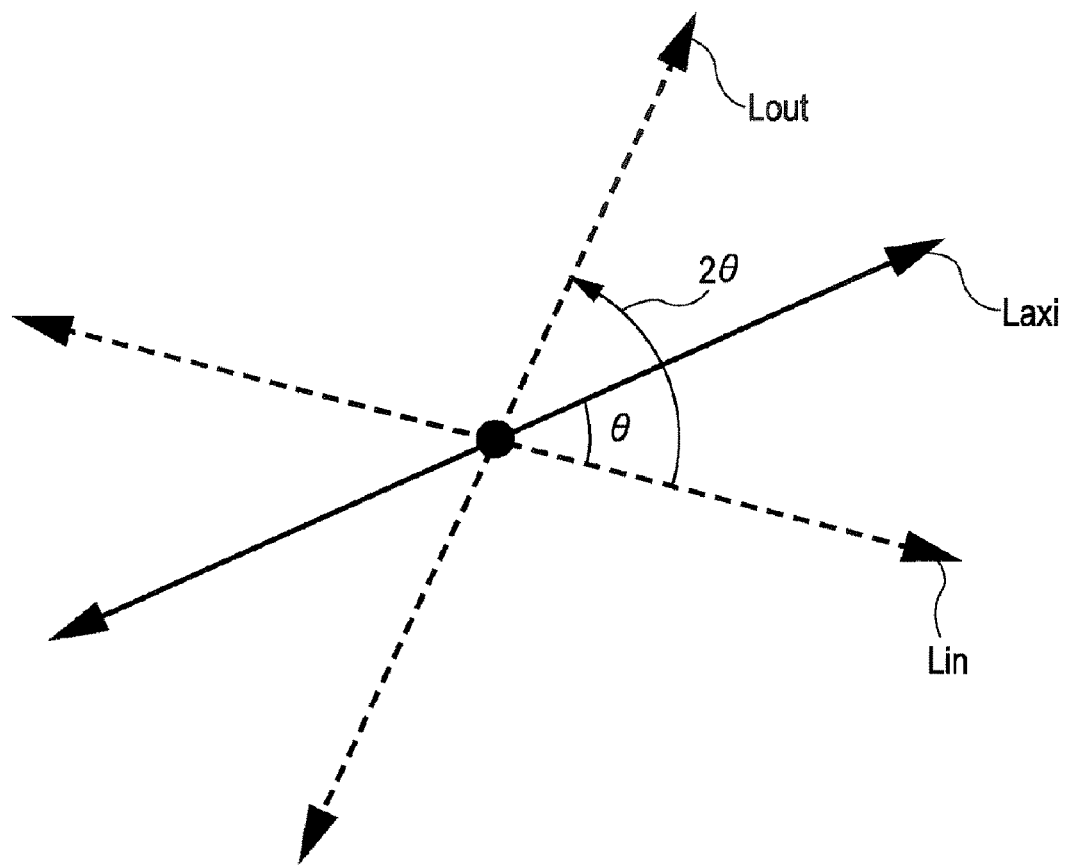
FIG. 14 is a diagram illustrating the relationship among the phase advancing axis of a half-wave plate, incident light, and exiting light.

FIG. 14 shows the relationship between the phase advance axis of the half-wave plate and incident light and exiting light. The half-wave plates 31 and 32 are retardation films, which are optical elements that apply a phase difference of $\pi$ to the incident light, in which when the light enters at an angle of $\theta$° with respect to the direction of the vibration of the electric field of the incident light, or the polarizing axis, with respect to the phase advancing axis of the half-wave plate, it rotates the direction of the vibration by $2\theta$°. Referring to FIG. 14, when light enters the half-wave plate with the angle formed by the polarizing axis Lin and the phase advancing axis Laxi of the half-wave plate at $\theta$°, the light exits with the angle formed by the polarizing axis Lout and the phase advancing axis Laxi at $\theta$° opposite to the polarizing axis Lin, that is, at an angle $2\theta$° with respect to the polarizing axis Lin. For example, the light incident on the half-wave plates 31 and 32 obtains the maximum rotation angle 90° when they enters with their polarizing axes at an angle of 45° with respect to the phase advancing axis of the half-wave plate. The retardation values of the half-wave plates 31 and 32 are preferably in the range from 230 nm to 290 nm.

FIGS. 15A, 15B, 16A, and 16B are diagrams showing the polarizing axes of the components of the image display device 100 according to the second embodiment, as viewed from above. The polarizing axes of FIGS. 15A to 16B are polarizing axes of the light from the polarization control region 7a of the lights with different polarizing axes separated by the polarization-controlling liquid crystal panel 7, that is, polarizing axes of the light with the first polarizing axis which has passed therethrough without its polarizing axes changed.

FIGS. 15A to 16B show the polarizing angles of the components other than the half-wave plates 31 and 32 together with arrows indicative of the directions of the polarizing axes of the light of the components. The angles of the advancing axes of the half-wave plates 31 and 32 with respect to the direction G (hereinafter, simply referred to as phase advancing angles) are shown to the right of the phase advancing axes of the half-wave plates 31 and 32. The polarizing angles and the phase advancing angles are ideal angles, and are not strictly limited to those, and substantially include angles at which the same effects are offered, that is, in the range of ±5° from the following angles.

As shown in FIGS. 15A to 16B, the image display device 100 according to the second embodiment is constructed such that the polarizing angle of the polarizing plate 4 on the light-incident side of the display panel 2 is set at 45° or 135°. For example, when the display panel 2 is a general liquid-crystal display panel, the polarizing plate 4 on the light-incident side of the display panel 2 is set as above so as to increase the viewing angle.

With the image display device 100 according to the second embodiment, when the polarizing angle of the polarizing plate 4 is set at 45° or 135°, the half-wave plates 31 and 32 are disposed on the light-incident side and the light-exiting side of the lenticular lens 8, respectively, to direct the polarizing axis of the light incident on the lenticular lens 8 in the direction substantially parallel to or perpendicular to the extension of the lens patterns 8a. A detailed description thereof is as follows:

FIG. 15A shows the image display device 100 according to the second embodiment in which the polarizing angle of the polarizing plate 4 is 45°, the polarizing angle of the polarizing plate 6 is 45°, and the phase advancing angles of the half-wave plates 31 and 32 are set at 22.5°.

As shown in FIG. 15A, the light emitted from the backlight 5 is polarized to have a polarizing angle of 45° by the polarizing plate 6. Of the light separated to have different polarizing axes by the polarization-controlling liquid crystal panel 7, the light exiting from the polarization control region 7a, that is, the light with the first polarizing axis which has passed therethrough, without its polarizing axis changed, enters the half-wave plate 31. The light with the first polarizing axis exits from the half-wave plate 31, with its polarizing angle changed to 0° by the half-wave plate 31. The light that has exited from the half-wave plate 31, with its polarizing angle changed to 0°, enters the lenticular lens 8 with its polarizing angle at 0°, as indicated by the polarizing axis 8in. The light incident on the lenticular lens 8 exits from the lenticular lens 8 with its polarizing angle held at 0°, as indicated by the polarizing axis 8out. The light that has exited from the lenticular lens 8, with its polarizing angle held at 0°, enters the half-wave plate 32. The polarizing angle of the light with a polarizing angle of 0° is changed to 45° through the half-wave plate 32, and exits from the half-wave plate 32. Of the light exiting from the half-wave plate 32 and polarized to have a polarizing angle of 45°, only the light that has passed through the retardation film 9 with its polarizing angle unchanged can pass through the polarizing plate 4 with its polarizing angle set at 45°.

On the other hand, of the light separated by the polarization-controlling liquid crystal panel 7 so as to have different polarizing axes, the light that exits from the polarization control region 7b, that is, the light with its polarizing angle changed to 1350 and having the second polarizing axis that is substantially orthogonal to the first polarizing axis enters the half-wave plate 31. The light with the second polarizing axis is polarized to have a polarizing angle of 90° through the half-wave plate 31, and exits therefrom. The light that exits from the half-wave plate 31, with its polarizing angle changed to 90°, enters the lenticular lens 8 with its polarizing angle at 90°. The light incident on the lenticular lens 8 exits from the lenticular lens 8 with its polarizing angle held at 90°. The light with a polarizing angle of 90° which has exited from the lenticular lens 8 enters the half-wave plate 32. The polarizing angle of the light with its polarizing angle at 90° is changed to 135° through the half-wave plate 32, and exits from the half-wave plate 32. Of the light with its polarizing angle changed to 135° which has exited from the half-wave plate 32, only the light whose polarizing angle is changed to 45° by the retardation film 9 can pass through the polarizing plate 4 with its polarizing angle set at 45°.

FIG. 15B shows the image display device 100 of the second embodiment in which the polarizing angle of the polarizing plate 4 is 45°, the polarizing angle of the polarizing plate 6 is 45°, and the phase advancing angles of the half-wave plates 31 and 32 are 67.5°.

As shown in FIG. 15B, the light emitted from the backlight 5 is polarized to have a polarizing angle of 45° by the polarizing plate 6. Of the light separated to have different polarizing axes by the polarization-controlling liquid crystal panel 7, the light exiting from the polarization control region 7a, that is, the light with the first polarizing axis which has passed therethrough, without its polarizing axis changed, enters the half-wave plate 31. The light with the first polarizing axis exits from the half-wave plate 31, with its polarizing angle changed to 90° by the half-wave plate 31. The light that has exited from the half-wave plate 31, with its polarizing angle changed to 90°, enters the lenticular lens 8 with its polarizing angle at 90°, as indicated by the polarizing axis 8in. The light incident on the lenticular lens 8 exits from the lenticular lens 8 with its polarizing angle held at 90°, as indicated by the polarizing axis 8out. The light exiting from the lenticular lens 8 with its polarizing angle at 90° enters the half-wave plate 32. The polarizing angle of the light with a polarizing angle of 90° is changed to 45° through the half-wave plate 32, and exits from the half-wave plate 32. Of the light exiting from the half-wave plate 32 and polarized to have a polarizing angle of 45°, only the light that has passed through the retardation film 9, with its polarizing angle unchanged, can pass through the polarizing plate 4 with its polarizing angle set at 45°.

On the other hand, of the light separated by the polarization-controlling liquid crystal panel 7 so as to have different polarizing axes, the light that exits from the polarization control region 7b, that is, the light with its polarizing angle changed to 135° and having the second polarizing axis that is substantially orthogonal to the first polarizing axis enters the half-wave plate 31. The light with the second polarizing axis is polarized to have a polarizing angle of 0° through the half-wave plate 31, and exits therefrom. The light that has exited from the half-wave plate 31, with its polarizing angle changed to 0°, enters the lenticular lens 8 with its polarizing angle at 0°. The light incident on the lenticular lens 8 exits from the lenticular lens 8 with its polarizing angle held at 0°. The light that has exited from the lenticular lens 8 with its polarizing angle held at 0° enters the half-wave plate 32. The polarizing angle of the light with its polarizing angle at 0° is changed to 135° through the half-wave plate 32, and exits from the half-wave plate 32. Of the light with its polarizing angle changed to 135° which has exited from the half-wave plate 32, only the light whose polarizing angle is changed to 45° by the retardation film 9 can pass through the polarizing plate 4 with its polarizing angle set at 45°.

In the examples of FIGS. 15A and 15B, the phase advancing axis of the half-wave plate 31 and the phase advancing axis of the half-wave plate 32 form an angle 22.5° and an angle 67.5°, respectively, with the direction perpendicular to the extension of the lens patterns 8a. Thus, even if the polarizing angle of the polarizing plate 4 on the light-incident side of the display panel 2 is 45°, the polarizing axis of the light incident on the lenticular lens 8 becomes substantially parallel to or perpendicular to the extension of the lens patterns 8a. Thus, the depolarization when light passes through the lenticular lens 8 can be prevented.

Figure 16A:
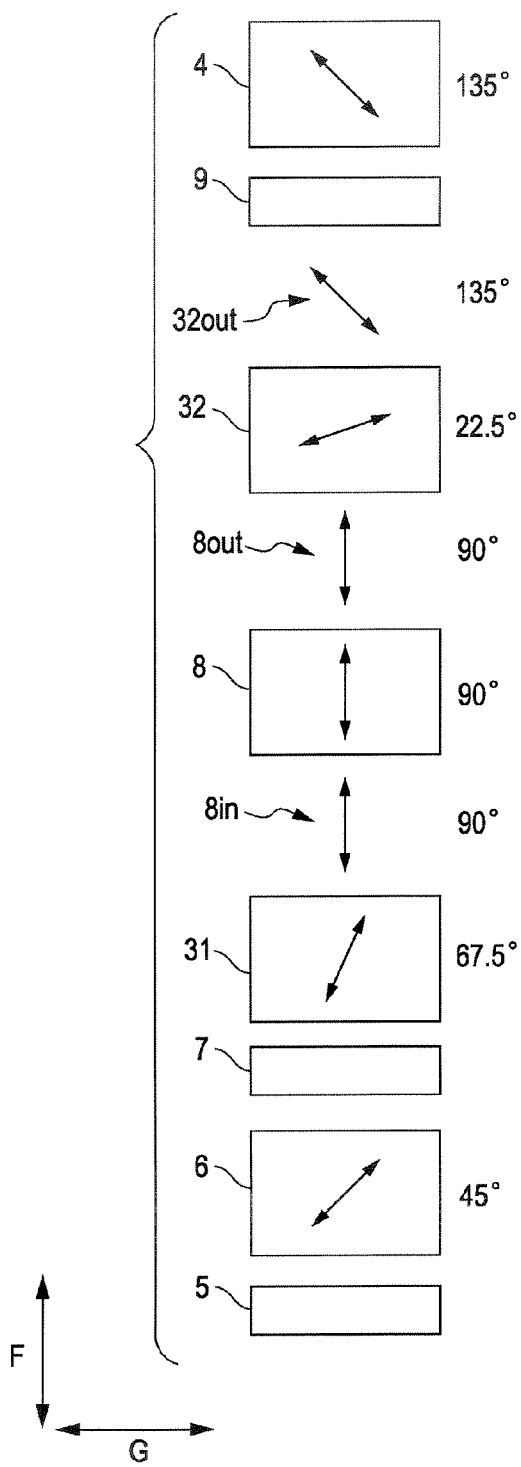
FIG. 16A is a diagram showing the polarizing axes of the components of the image display device, as viewed from above.

FIG. 16A shows the image display device 100 according to the second embodiment in which the polarizing angle of the polarizing plate 4 is 135°, the polarizing angle of the polarizing plate 6 is 45°, the phase advancing angle of the half-wave plate 31 is 67.5°, and the phase advancing angle of the half-wave plate 32 is 22.5°.

As shown in FIG. 16A, the light emitted from the backlight 5 is polarized to have a polarizing angle of 45° by the polarizing plate 6. Of the light separated to have different polarizing axes by the polarization-controlling liquid crystal panel 7, the light exiting from the polarization control region 7a, that is, the light with the first polarizing axis which has passed therethrough, with its polarizing axis unchanged, enters the half-wave plate 31. The light with the first polarizing axis exits from the half-wave plate 31, with its polarizing angle changed to 90° by the half-wave plate 31. The light that has exited from the half-wave plate 31, with its polarizing angle changed to 90°, enters the lenticular lens 8 with its polarizing angle at 90°, as indicated by the polarizing axis 8in. The light incident on the lenticular lens 8 exits from the lenticular lens 8 with its polarizing angle held at 90°, as indicated by the polarizing axis 8out. The light exiting from the lenticular lens 8 with its polarizing angle held at 90° enters the half-wave plate 32. The polarizing angle of the light with a polarizing angle of 90° is changed to 135° through the half-wave plate 32, and exits from the half-wave plate 32. Of the light exiting from the half-wave plate 32 and polarized to have a polarizing angle of 135°, only the light that has passed through the retardation film 9 with its polarizing angle unchanged can pass through the polarizing plate 4 with its polarizing angle at 135°.

On the other hand, of the light separated by the polarization-controlling liquid crystal panel 7 so as to have different polarizing axes, the light that exits from the polarization control region 7b, that is, the light with its polarizing angle changed to 135° and having the second polarizing axis that is substantially orthogonal to the first polarizing axis enters the half-wave plate 31. The light with the second polarizing axis is polarized to have a polarizing angle of 0° through the half-wave plate 31, and exits therefrom. The light that exits from the half-wave plate 31, with its polarizing angle changed to 0°, enters the lenticular lens 8 with its polarizing angle at 0°. The light incident on the lenticular lens 8 exits from the lenticular lens 8 with its polarizing angle held at 0°. The light that has exited from the lenticular lens 8 with its polarizing angle held at 0° enters the half-wave plate 32. The polarizing angle of the light with its polarizing angle at 0° is changed to 45° through the half-wave plate 32 and exits from the half-wave plate 32. Of the light with its polarizing angle changed to 45° which has exited from the half-wave plate 32, only the light whose polarizing angle is changed to 135° by the retardation film 9 can pass through the polarizing plate 4 with its polarizing angle set at 135°.

Figure 16B:
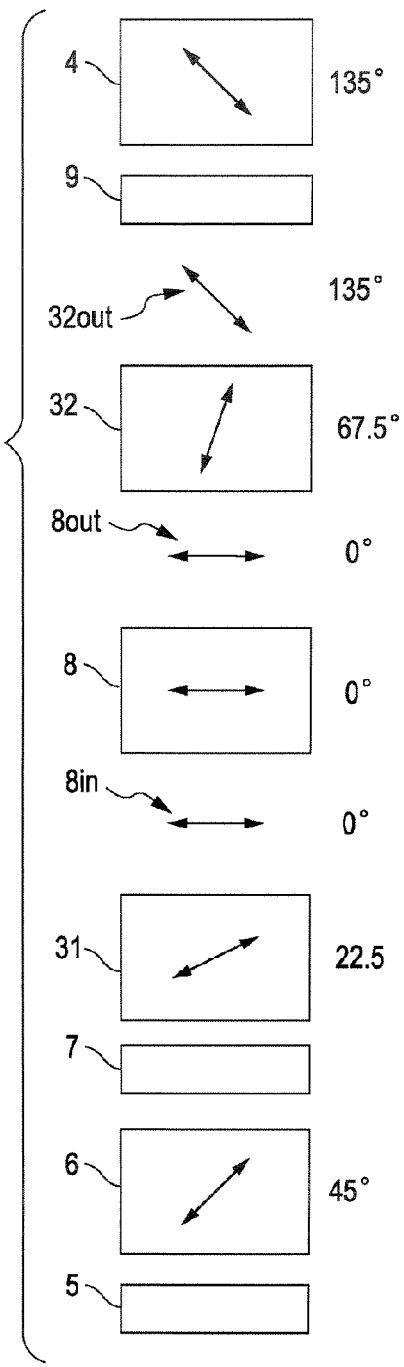
FIG. 16B is a diagram showing the polarizing axes of the components of the image display device, as viewed from above.

FIG. 16B shows the image display device 100 according to the second embodiment in which the polarizing angle of the polarizing plate 4 is 135°, the polarizing angle of the polarizing plate 6 is 45°, the phase advancing angle of the half-wave plate 31 is 22.5°, and the phase advancing angle of the half-wave plate 32 is 67.5°.

As shown in FIG. 16B, the light emitted from the backlight 5 is polarized to a polarizing angle of 45° by the polarizing plate 6. Of the light separated to have different polarizing axes by the polarization-controlling liquid crystal panel 7, the light exiting from the polarization control region 7a, that is, the light with the first polarizing axis which has passed therethrough, without its polarizing axis changed, enters the half-wave plate 31. The light with the first polarizing axis exits from half-wave plate 31, with its polarizing angle being changed to 0° by the half-wave plate 31. The light that has exited from the half-wave plate 31, with its polarizing angle changed to 0°, enters the lenticular lens 8 with its polarizing angle at 90°, as indicated by the polarizing axis 8in. The light incident on the lenticular lens 8 exits from the lenticular lens 8, with its polarizing angle held at 0°, as indicated by the polarizing axis Bout. The light exiting from the lenticular lens 8, with its polarizing angle at 0°, enters the half-wave plate 32. The polarizing angle of the light with a polarizing angle of 0° is changed to 135° through the half-wave plate 32, and exits from the half-wave plate 32. Of the light exiting from the half-wave plate 32 and polarized to a polarizing angle of 135°, only the light that has passed through the retardation film 9, with its polarizing angle unchanged, can pass through the polarizing plate 4 with its polarizing angle set at 135°.

On the other hand, of the light separated by the polarization-controlling liquid crystal panel 7 so as to have different polarizing axes, the light that exits from the polarization control region 7b, that is the light with its polarizing angle changed to 135° and having the second polarizing axis that is substantially orthogonal to the first polarizing axis enters the half-wave plate 31. The light with the second polarizing axis is polarized to have a polarizing angle of 90° through the half-wave plate 31, and exits therefrom. The light that has exited from the half-wave plate 31, with its polarizing angle changed to 0°, enters the lenticular lens 8, with its polarizing angle held at 90°. The light incident on the lenticular lens 8 exits from the lenticular lens 8 with its polarizing angle held at 90°. The light that has exited from the lenticular lens 8 with its polarizing angle held at 90° enters the half-wave plate 32. The polarizing angle of the light with its polarizing angle at 90° is changed to 45° through the half-wave plate 32, and exits from the half-wave plate 32. Of the light with its polarizing angle changed to 45° which has exited from the half-wave plate 32, only the light whose polarizing angle is changed to 135° by the retardation film 9 can pass through the polarizing plate 4 with its polarizing angle set at 135°.

In the examples of FIGS. 16A and 16B, of the phase advancing axes of the half-wave plate 31 and the half-wave plate 32, an angle formed with the direction perpendicular to the extension of the lens patterns 8a is set to 22.5° and the other angle formed with the direction perpendicular to the extension of the lens patterns 8a is set to 67.5°. Thus, even if the polarizing angle of the polarizing plate 4 on the light-incident side of the display panel 2 is 135°, the polarizing axis of the light incident on the lenticular lens 8 becomes substantially parallel to or perpendicular to the extension of the lens patterns 8a. Thus, the depolarization when light passes through the lenticular lens 8 can be prevented.

Application

Although the foregoing embodiments have a structure in which the lenticular lens 8 has a plurality of semicolumnar lens patterns 8a protruding toward the display panel 2, the invention is not limited to that. Alternatively, the semicolumnar lens patterns 8a may protrude in the direction opposite to the display panel 2, that is, to the polarization-controlling liquid crystal panel 7. The invention may include a lens having a linear lens pattern with another cross section, such as a triangular cross section, in place of the semicolumnar-cross-section lenticular lens 8.

Although the foregoing embodiments have a structure in which the lenticular lens 8 is an independent component in the image display device 100, the invention is not limited to that; instead, one of the pair of substrates of the polarization-controlling liquid crystal panel 7 may be in the shape of the lenticular lens so that the polarization-controlling liquid crystal panel 7 serves both as the lenticular lens. This allows the image display device 100 to be slimmed down.

Although the foregoing embodiments are constructed such that the polarization-controlling liquid crystal panel 7 has the stripe electrodes 7d on the light-exiting side substrate, the invention is not limited to that; instead, the light-incident side substrate may have the stripe electrodes 7d.

The invention may use various display panels such as liquid-crystal display panels, plasma display panels, or organic electroluminescent display panels.

Electronic Device

Figure 17:
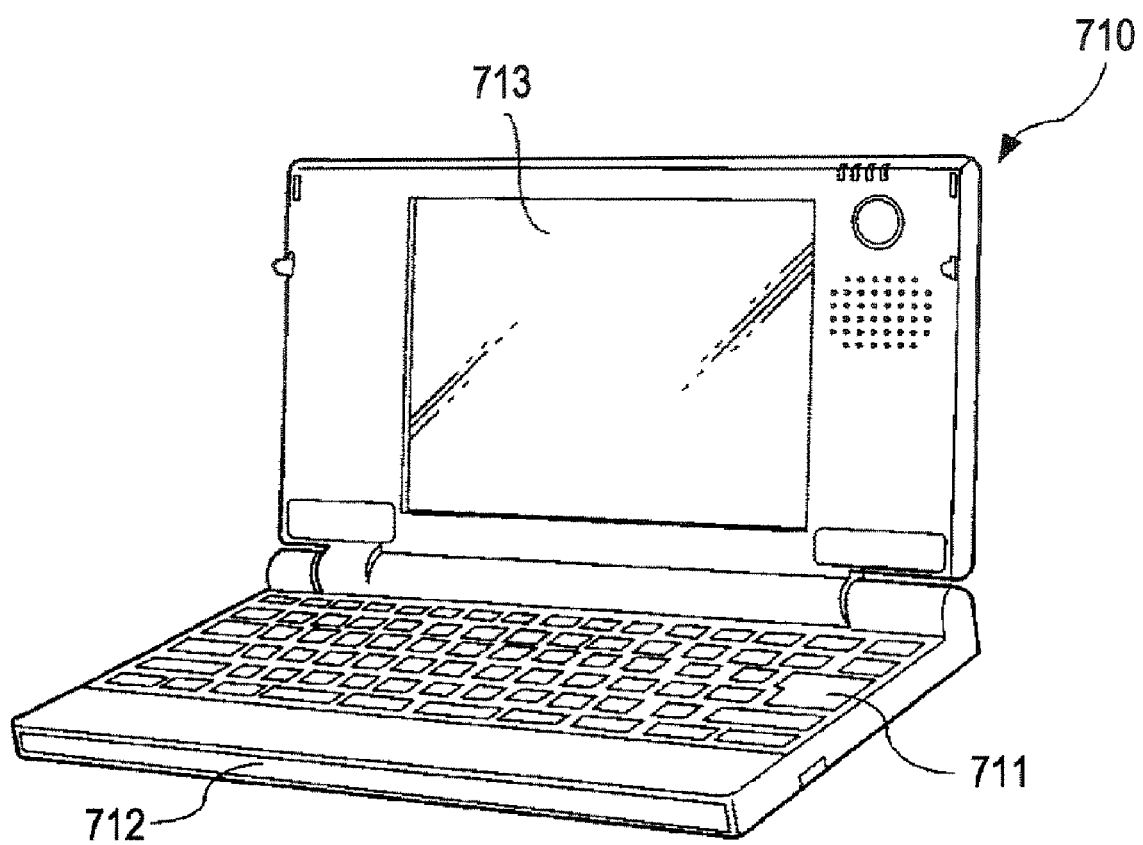
FIG. 17 is a perspective view of an electronic device incorporating the image display device according to an embodiment of the invention.

Referring to FIG. 17, an example of electronic devices that can incorporate the image display device 100 according to the foregoing embodiments will be described.

An example in which the image display device 100 according to the embodiments is applied to the display of a portable personal computer (a notebook personal computer) will be described. FIG. 17 is a perspective view of the personal computer denoted by numeral 710. The personal computer 710 includes a main body 712 having a keyboard 711 and a display section 713 incorporating the image display device 100 and so on according to the embodiments of the invention.

It is particularly preferable that the image display device 100 according to the embodiments be applied to the displays of liquid-crystal televisions and car navigation systems. For example, the use of the image display device 100 according to the first embodiment as the display of car navigation systems allows map images to be displayed for a viewer in a driver seat and movies or other images to be displayed for a viewer in a passenger seat.

Electronic devices that can incorporate the image display device 100 according to the embodiments include not only the foregoing devices but also viewfinder monitor-direct-view video tape recorders, pagers, electronic notebooks, electronic calculators, mobile phones, word processors, work stations, TV phones, POS terminals, and digital still cameras.

The entire disclosure of Japanese Patent Application No. 2006-011216, filed Jan. 19, 2006 is expressly incorporated by reference herein.

What is claimed is:

1. An electro-optic device comprising:
   a display panel that displays images;
   an illumination system that applies light to the display panel;
   a first polarizing unit, disposed between the illumination system and the display panel, that passes light with a first polarizing axis from the illumination system;
   a polarization-controlling liquid crystal panel, disposed between the first polarizing unit and the display panel, that includes first polarization control regions that extend in a first direction and second polarization control regions that extend in the first direction,
   wherein the first and second polarization control regions are located in alternating succession along a second direction that is orthogonal to the first direction,
   wherein light with the first polarizing axis passes through the first polarization control regions, and
   wherein light with a second polarizing axis, which is formed by changing the first polarizing axis substantially orthogonally, passes through the second polarization control regions;
   a first half-wave plate, disposed between the polarization-controlling liquid crystal panel and the display panel, that applies a phase difference to incident light;
   a lens disposed between the first half-wave plate and the display panel, wherein the lens includes a plurality of linear lens patterns directing light with the first polarizing axis and light with the second polarizing axis into specified directions;
   a second half-wave plate, disposed between the lens and the display panel, that applies the phase difference to incident light;
   a retardation film, disposed between the second half-wave plate and the display panel, that includes transmitting regions that extend in the second direction and polarizing regions that extend in the second direction,
   wherein the transmitting regions and the polarizing regions are located in alternating succession along the first direction,
   wherein incident light passes through the transmitting regions, and
   wherein the polarizing axis of incident light is changed 90 degrees in the polarizing regions; and
   a second polarizing unit disposed between the retardation film and the display panel,
   wherein an angle of the polarizing axis of the first polarizing unit relative to the second direction is in a range of 40 degrees to 50 degrees,
   wherein an angle of the polarizing axis of the second polarizing unit relative to the second direction is in a range of 40 degrees to 50 degrees,
   wherein angles of a phase advancing axis of the first half-wave plate and a phase advancing axis of the second half-wave plate relative to the second direction are in one of a first range and a second range, and
   wherein the first range is from 17.5 degrees to 27.5 degrees and the second range is from 62.5 degrees to 72.5 degrees.

2. The electro-optic device according to claim 1, wherein the polarization-controlling liquid crystal panel includes a plurality of electrodes that control the first polarization control regions and the second polarization control regions.

3. An electronic device comprising a display including the electro-optic device according to claim 2.

4. An electronic device comprising a display including the electro-optic device according claim 1.

5. An electro-optic device comprising:
   an illumination system that generates light;
   a first polarizing unit, disposed between the illumination system and a first surface of the electro-optic device, that passes light with a first polarizing axis from the illumination system;
   a polarization-controlling liquid crystal panel, disposed between the first polarizing unit and the first surface, that includes first polarization control regions that extend in a first direction and second polarization control regions that extend in the first direction, wherein the first and second polarization control regions are located in alternating succession along a second direction that is orthogonal to the first direction, wherein light with the first polarizing axis passes through the first polarization control regions, and wherein light with a second polarizing axis, which is formed by changing the first polarizing axis substantially orthogonally, passes through the second polarization control regions;

a first half-wave plate, disposed between the polarization-controlling liquid crystal panel and the first surface, that applies a phase difference to incident light;

a lens disposed between the first half-wave plate and the first surface, wherein the lens includes a plurality of linear lens patterns directing light with the first polarizing axis and light with the second polarizing axis into specified directions;

a second half-wave plate, disposed between the lens and the first surface, that applies the phase difference to incident light;

a retardation film, disposed between the second half-wave plate and the first surface, that includes transmitting regions that extend in the second direction and polarizing regions that extend in the second direction, wherein the transmitting regions and the polarizing regions are located in alternating succession along the first direction, wherein incident light passes through the transmitting regions, and wherein the polarizing axis of incident light is changed 90 degrees in the polarizing regions; and a second polarizing unit disposed between the retardation film and the first surface, wherein an angle of the polarizing axis of the first polarizing unit relative to the second direction is in a range of 40 degrees to 50 degrees, wherein an angle of the polarizing axis of the second polarizing unit relative to the second direction is in a range of 40 degrees to 50 degrees, wherein angles of a phase advancing axis of the first half-wave plate and a phase advancing axis of the second half-wave plate relative to the second direction are in one of a first range and a second range, and wherein the first range is from 17.5 degrees to 27.5 degrees and the second ranges is from 62.5 degrees to 72.5 degrees.

6. The electro-optic device according to claim 5, wherein the polarization-controlling liquid crystal panel includes a plurality of electrodes that control the first polarization control regions and the second polarization control regions.

7. An electronic device comprising a display including the electro-optic device according to claim 5.

* * * * *